United States Patent
Maeda

(10) Patent No.: US 7,031,673 B1
(45) Date of Patent: Apr. 18, 2006

(54) WIRELESS COMMUNICATION DEVICE

(75) Inventor: Miho Maeda, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 413 days.

(21) Appl. No.: 10/148,576

(22) PCT Filed: Oct. 4, 2000

(86) PCT No.: PCT/JP00/06929

§ 371 (c)(1),
(2), (4) Date: Aug. 27, 2002

(87) PCT Pub. No.: WO02/29986

PCT Pub. Date: Apr. 11, 2002

(51) Int. Cl.
*H03C 1/62* (2006.01)

(52) U.S. Cl. .............................. 455/115.1; 455/67.11; 455/226.1; 340/636.18

(58) Field of Classification Search .. 455/115.1–115.4, 455/226.1–226.4, 67.11, 67.13, 336, 343.5, 455/403, 418, 338, 227–228; 340/636.18, 340/636.19, 635, 572.4, 853.2
See application file for complete search history.

(56) References Cited

U.S. PATENT DOCUMENTS

| | | | | |
|---|---|---|---|---|
| 5,239,684 A | * | 8/1993 | Ishikura ..................... | 455/67.7 |
| 5,280,369 A | * | 1/1994 | Minamizawa ................ | 358/479 |
| 5,438,695 A | * | 8/1995 | Morimura et al. .......... | 455/572 |
| 5,450,471 A | * | 9/1995 | Hanawa et al. .......... | 455/550.1 |
| 5,603,106 A | * | 2/1997 | Toda .......................... | 455/126 |
| 6,087,944 A | * | 7/2000 | Santacatterina et al. .... | 340/588 |
| 6,363,260 B1 | * | 3/2002 | Achour et al. ........... | 455/553.1 |
| 6,442,404 B1 | * | 8/2002 | Sakajiri ...................... | 455/557 |
| 6,526,288 B1 | * | 2/2003 | Khalifa et al. .............. | 455/557 |

FOREIGN PATENT DOCUMENTS

| JP | 3-9622 | 1/1991 |
|---|---|---|
| JP | 3-96134 | 4/1991 |

(Continued)

*Primary Examiner*—CongVan Tran
(74) *Attorney, Agent, or Firm*—Oblon, Spivak, McClelland, Maier & Neustadt, P.C.

(57) ABSTRACT

A radio communication device capable of changing an output signal to a proper transmission output value in accordance with a usage mode, including a storing unit for storing a plurality of maximum transmission outputs corresponding to a plurality of predetermined usage modes; a usage mode detecting unit for detecting a usage mode; a maximum transmission output determining unit connected to the usage mode detecting unit and the storing unit, for determining a maximum transmission output on the basis of a detection result of the usage mode detecting unit; a transmission circuit for transmitting a signal to the outside; and an output control circuit connected to the maximum transmission output determining unit and the transmission circuit, for controlling a transmission output from the transmission circuit on the basis of the maximum transmission output.

24 Claims, 21 Drawing Sheets

FOREIGN PATENT DOCUMENTS

| | | |
|---|---|---|
| JP | 4-95438 | 3/1992 |
| JP | 8-065365 | 3/1996 |
| JP | 8-77481 | 3/1996 |
| JP | 8-195790 | 7/1996 |
| JP | 10-79701 | 3/1998 |
| JP | 10-313481 | 11/1998 |
| JP | 11-504187 | 4/1999 |
| JP | 11-136318 | 5/1999 |
| JP | 11-239201 | 8/1999 |
| JP | 11-308142 | 11/1999 |
| JP | 11-331934 | 11/1999 |
| JP | 2000-59482 | 2/2000 |
| JP | 2000-101508 | 4/2000 |
| JP | 2000-165477 | 6/2000 |
| WO | 93/16560 | 8/1993 |

\* cited by examiner

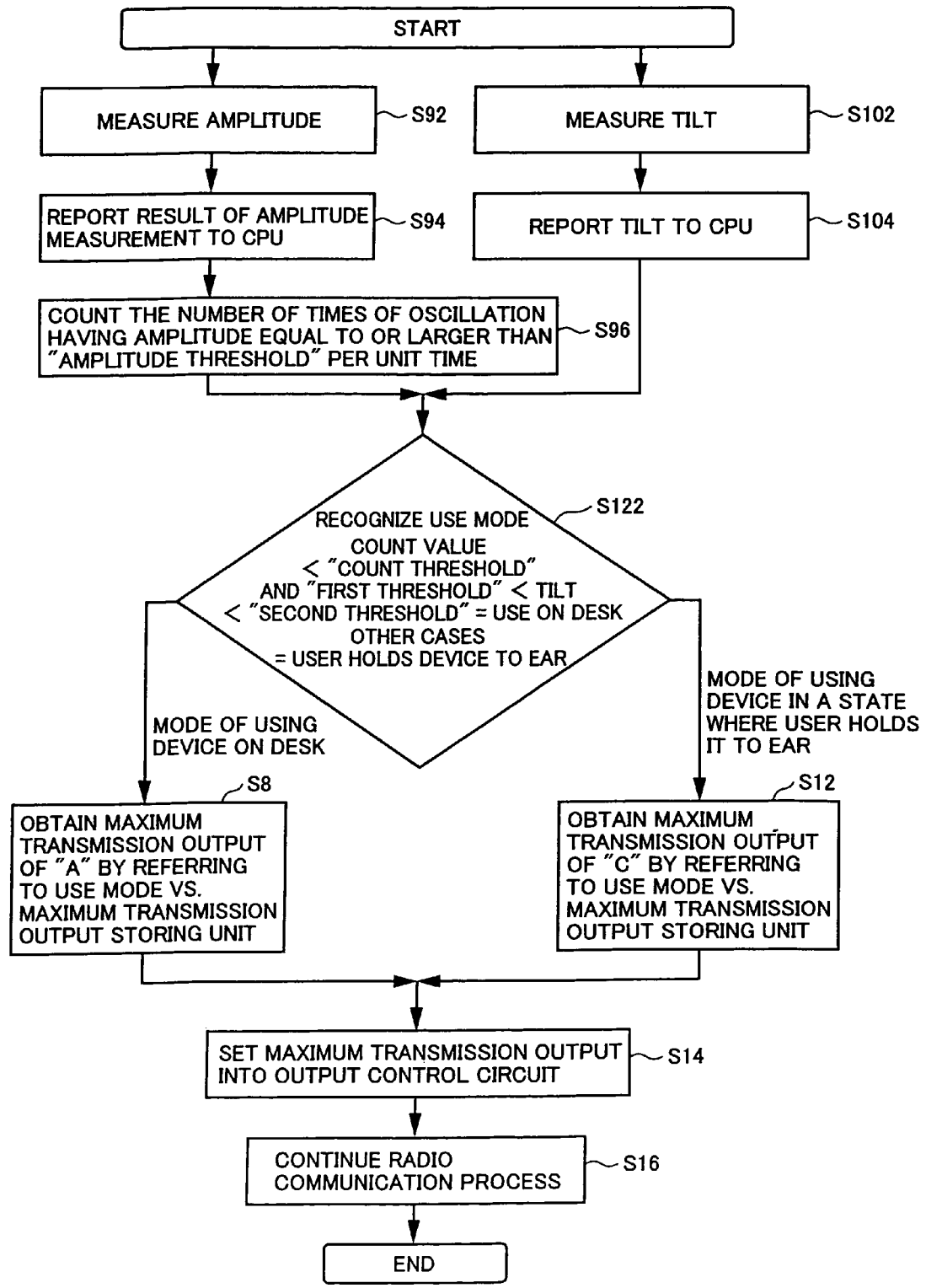

WIRELESS COMMUNICATION DEVICE

BACKGROUND OF THE INVENTION

1. Technical Field

The present invention relates to a radio communication device and, more particularly, to a radio communication device capable of transmitting an optimum radio output in accordance with a usage mode.

2. Background Art

Conventionally, a booster (radio output amplifier) is generally connected to a portable telephone to enhance a radio output.

For example, referring to FIG. 1, a radio communication device disclosed in Japanese Patent Laying-Open No. 8-65365 includes a portable telephone 116 and a booster 117 connected to each other via an RF (Radio Frequency) signal line 118 and a control signal line 119.

Portable telephone 116 includes an antenna 5, a transmission circuit 2 for transmitting an output signal, an output control circuit 4 for controlling an output of transmission circuit 2, a switch 120 connected to transmission circuit 2, for receiving the output signal of the transmission circuit 2 as an input and leading the output signal to booster 117 via RF signal line 118 or to antenna 5 on the basis of a selection signal from a control circuit to be described hereinafter, and a control circuit 103 connected to output control circuit 4 and the switch 120, for controlling output control circuit 4 and supplying the selection signal to switch 120.

Control circuit 103 includes an amplification level storing device 121, a maximum transmission output storing device 122, a connection detecting circuit 123, and a CPU (Central Processing Unit) 107.

Booster 117 includes an output amplifying circuit 124 for amplifying an output signal received from portable telephone 116 via RF signal line 118, an output control circuit 125 connected to output amplifying circuit 124, for controlling an output from the output amplifying circuit, an antenna 127 connected to output amplifying circuit 124, and a control circuit 126 connected to control signal line 119 and output control circuit 125, for controlling output control circuit 125.

Control circuit 126 includes an amplification level storing device 128 and a CPU 129 connected to amplification level storing device 128.

When booster 117 is connected to portable telephone 116, the connection of booster 117 is detected by connection detecting circuit 123 in portable telephone 116. In CPU 107 in portable telephone 116, information indicating whether portable telephone 116 is in a call mode or a standby mode is stored. According to the information, CPU 107 determines whether portable telephone 116 is in the call mode or standby mode at the time when booster 117 is connected to portable telephone 116.

When it is determined that booster 117 is connected during a call, on portable telephone 116 side, by an instruction of CPU 107, information indicating that portable telephone 116 and booster 117 are connected is transmitted from control circuit 103 to booster 117 via control signal line 119. CPU 107 transmits information of a necessary amplification level on booster 117 side, which is stored in amplification level storing device 121 to booster 117 via control signal line 119. Further, CPU 107 calculates a transmission output value obtained by subtracting an output level stored in amplification level storing device 121 from an output level stored in maximum transmission output storing device 122 set at the start of a call. On the basis of the transmission output value, control circuit 103 transmits a control signal to output control circuit 4. Output control circuit 4 controls transmission circuit 2 so as to set the transmission output to a desired level.

As a result, the output whose level has been changed is output from transmission circuit 2. Simultaneously, control circuit 103 controls switch 120 to switch the direction of the radio signal from antenna 5 of the portable telephone to RF signal line 118. The radio signal is supplied to output amplifying circuit 124 in booster via RF signal line 118.

When control circuit 126 in booster 117 receives information that portable telephone 116 and booster 117 are connected to each other during a call from portable telephone 116 via control signal line 119, control circuit 126 notifies CPU 129 of the information. Further, when control circuit 126 receives the amplification level information from portable telephone 116, control circuit 126 stores the information into amplification level storing device 128. On the basis of the amplification level information stored in amplification level storing device 128, CPU 129 controls output amplifying circuit 124 via output control circuit 125. Output amplifying circuit 124 transmits the amplified output signal from antenna 127.

In such a manner, a radio output control for controlling an output so as to not exceed a maximum transmission output which is set at the time of start of a call even when portable telephone 116 is connected to booster 117 during a call can be realized. That is, in the radio communication device, according to a mechanical difference whether antenna 5 of portable telephone 116 is used or antenna 127 of booster 117 is used, the maximum transmission output value of an output signal is adjusted.

In the device, however, when an output signal is desired to be changed to an optimum transmission output value according to a usage mode such as a mode of using the device on a desk or a mode of using the device by applying the portable telephone to an ear of the user, there is a problem that such a control cannot be performed.

SUMMARY OF THE INVENTION

The present invention has been achieved to solve the problem and its object is to provide a radio communication device capable of changing an output signal to a proper transmission output value in accordance with a usage mode.

Another object of the invention is to provide a radio communication device capable of automatically detecting the usage mode and changing an output signal to a proper transmission output value.

A radio communication device according to an aspect of the invention includes: a storing unit for storing a plurality of maximum transmission outputs corresponding to a plurality of predetermined usage modes, a usage mode detecting unit for detecting a usage mode, a maximum transmission output determining unit connected to the usage mode detecting unit and the storing unit, for determining a maximum transmission output on the basis of a detection result of the usage mode detecting unit, a transmission circuit for transmitting a signal to the outside, and an output control circuit connected to the maximum transmission output determining unit and the transmission circuit, for controlling a transmission output from the transmission circuit on the basis of the maximum transmission output. A usage mode is detected by the usage mode detecting unit, and the maximum transmission output is determined on the basis of the usage mode. Consequently, according to the usage mode, the output signal can be changed to a proper transmission output value.

Preferably, the usage mode detecting unit detects a usage mode at the time of receiving an incoming call or originating a call. Only at the time of receiving an incoming call or at the time of originating a call, the usage mode is detected. Consequently, in the case where the usage mode is not changed during communication, the number of processes of the usage mode detecting unit can be minimized.

More preferably, the usage mode detecting unit detects the usage mode at turn-on of the radio communication device. The usage mode is detected only at turn-on. Consequently, in the case of a radio communication device in which the usage mode is not changed after turn-on, the number of processes of the usage mode detecting unit can be minimized.

More preferably, the usage mode detecting unit includes a temperature measuring unit for measuring temperature of the periphery of the radio communication device, and a detecting circuit connected to the temperature measuring unit, for detecting a usage mode on the basis of an output result of the temperature measuring unit. When the temperature of the periphery of the radio communication device changes according to the usage mode, by measuring the temperature of the periphery of the radio communication device, the usage mode is detected, and the output signal can be changed to a proper transmission output value.

More preferably, the usage mode detecting unit includes a distance measuring unit for measuring a distance from the radio communication device to an obstacle, and a detecting circuit connected to the distance measuring unit, for detecting the usage mode on the basis of an output result of the distance measuring unit. When the distance between the radio communication device and an obstacle (for example, the user) changes according to the usage mode, by measuring the distance from the radio communication device to the obstacle (for example, the user), the usage mode is detected, and an output signal can be changed to a proper transmission output value.

More preferably, the usage mode detecting unit includes an amplitude measuring unit for measuring amplitude of oscillation of the radio communication device, and a detecting circuit connected to the amplitude measuring unit, for detecting a usage mode on the basis of an output result of the amplitude measuring unit. When the oscillation of the radio communication device changes according to the usage mode, by measuring the amplitude of oscillation of the radio communication device, the usage mode is detected, and an output signal can be changed to a proper transmission output value.

More preferably, the usage mode detecting unit includes a tilt measuring unit for measuring a tilt of the radio communication device, and a detecting circuit connected to the tilt measuring unit, for detecting a usage mode on the basis of an output result of the tilt measuring unit. When the tilt of the radio communication device changes according to the usage mode, by measuring the tilt of the radio communication device, the usage mode is detected, and an output signal can be changed to a proper transmission output value.

More preferably, the usage mode detecting unit includes an operation unit for receiving an operation on the radio communication device, and a detecting circuit connected to the operation unit, for detecting a usage mode on the basis of an output result of the operation unit. When the usage mode is determined by an operating method particular to the user, by analyzing the operation of the user, the usage mode is detected, and an output signal can be changed to a proper transmission output value.

More preferably, the usage mode detecting unit includes an amplitude measuring unit for measuring amplitude of oscillation of the radio communication device, a tilt measuring unit for measuring a tilt of the radio communication unit, and a detecting circuit connected to the amplitude measuring unit and the tilt measuring unit, for detecting a usage mode on the basis of output results of the amplitude measuring unit and the tilt measuring unit.

By preparing a plurality of realizing methods of recognizing the usage mode in accordance with the characteristics of the radio communication device, the usage mode is detected, and an output signal can be changed to a proper transmission output value.

BRIEF DESCRIPTION OF THE DRAWINGS

FIG. 23 is a flow chart of processes executed by the radio communication device according to the tenth embodiment.

DESCRIPTION OF THE PREFERRED EMBODIMENTS

First Embodiment

Figure 1:
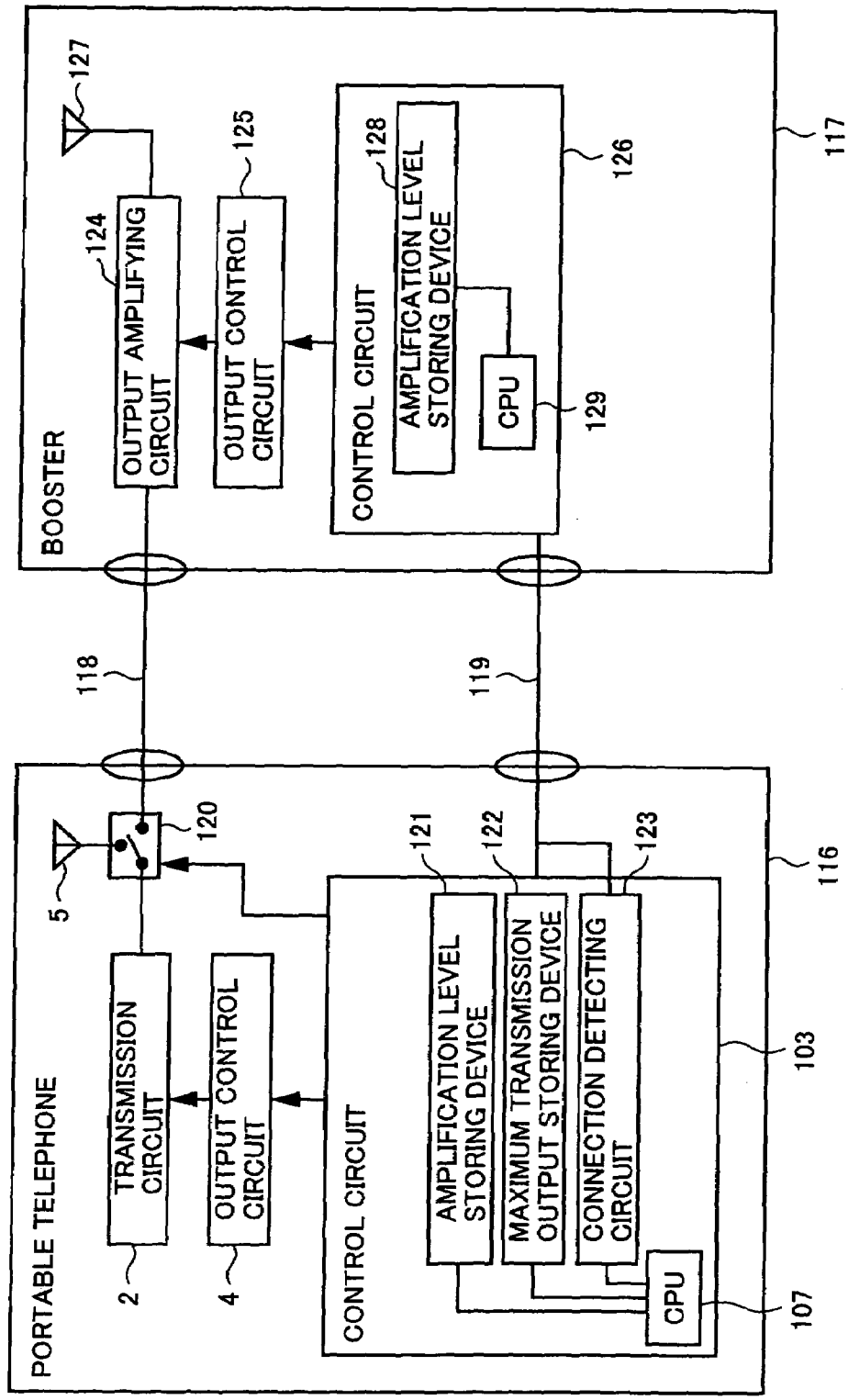
FIG. 1 is a block diagram showing a hardware configuration of a radio communication device disclosed in Japanese Patent Laying-Open No. 8-65365.
Figure 2:
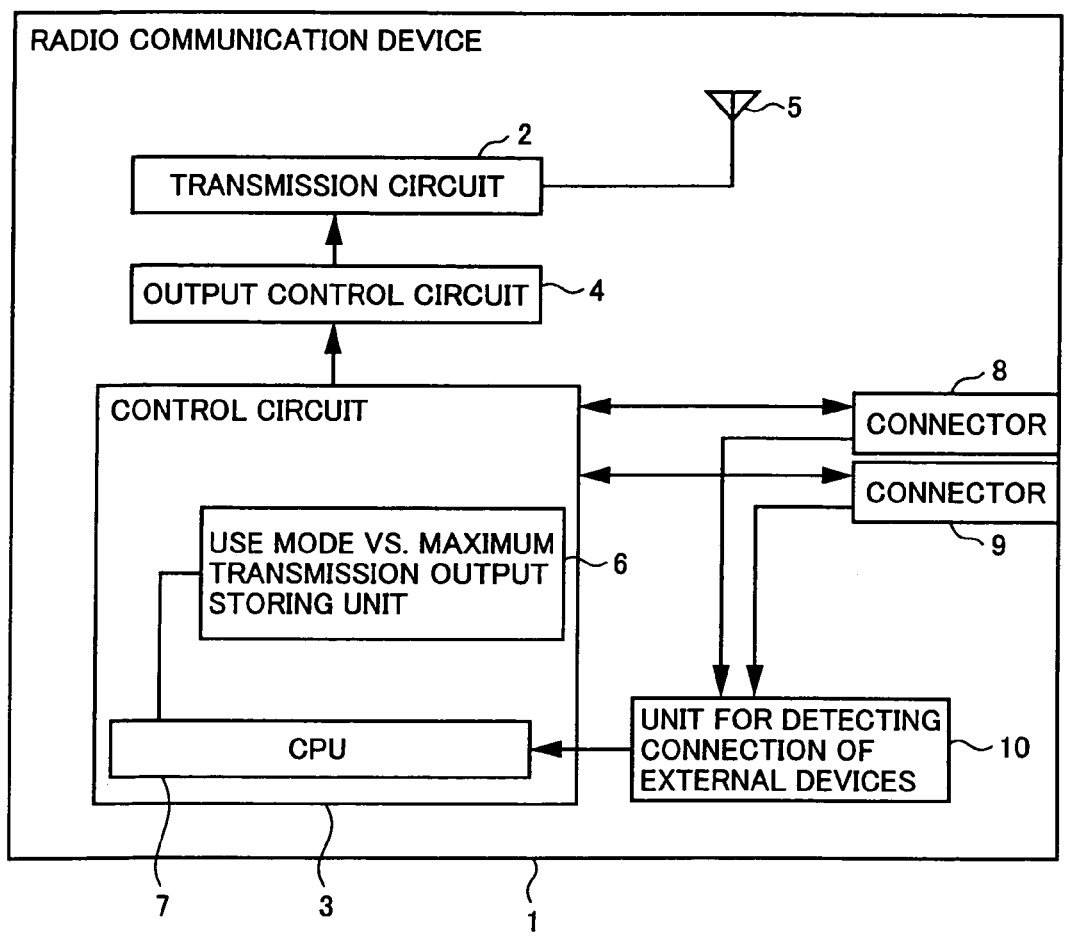
FIG. 2 is a block diagram showing a hardware configuration of a radio communication device according to a first embodiment of the present invention.

Referring to FIG. 2, a radio communication device 1 according to a first embodiment of the present invention includes an antenna 5, a transmission circuit 2 connected to antenna 5, for transmitting an output signal from antenna 5, an output control circuit 4 connected to transmission circuit 2, for controlling an output of transmission circuit 2, two connectors 8 and 9, a unit 10 for detecting connection of an external device or the like, which detects whether or not an external device or the like is connected to connector 8 or 9, and a control circuit 3 connected to connectors 8 and 9, unit 10 for detecting connection of an external device, and output control circuit 4, for controlling output control circuit 4 in accordance with an output of unit 10 for detecting connection of an external device.

Control circuit 3 includes a usage mode vs. maximum transmission output storing unit 6 for storing a plurality of maximum transmission outputs determined according to a plurality of usage modes of radio communication device 1, and a CPU 7 connected to usage mode vs. maximum transmission output storing unit 6 and unit 10 for detecting connection of an external device, for controlling output control circuit 4 by executing processes of a flow chart which will be described hereinafter in accordance with an output of unit 10 for detecting connection of an external device.

Figure 3:
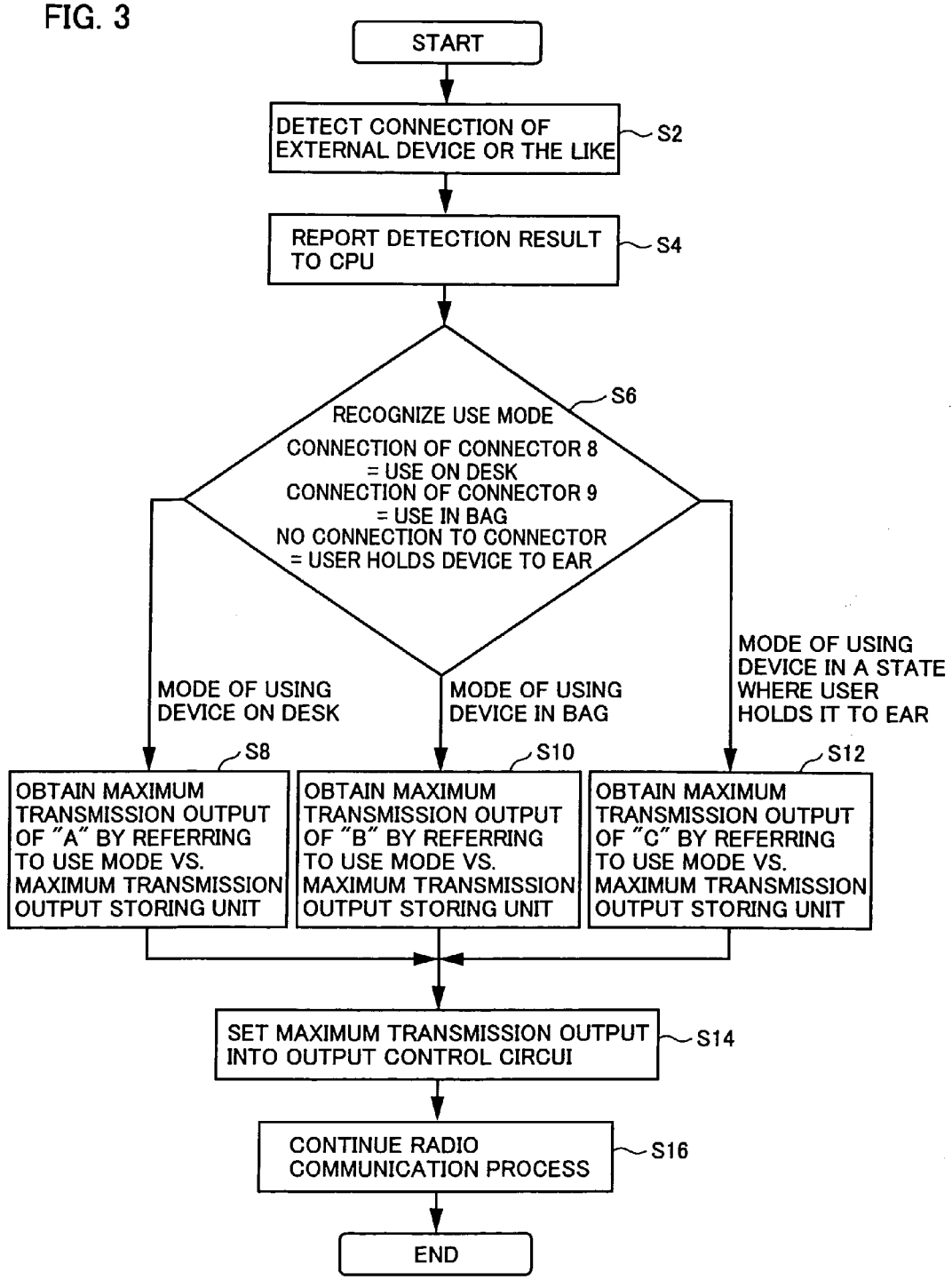
FIG. 3 is a flow chart of processes executed by the radio communication device according to the first embodiment.
Figure 4:
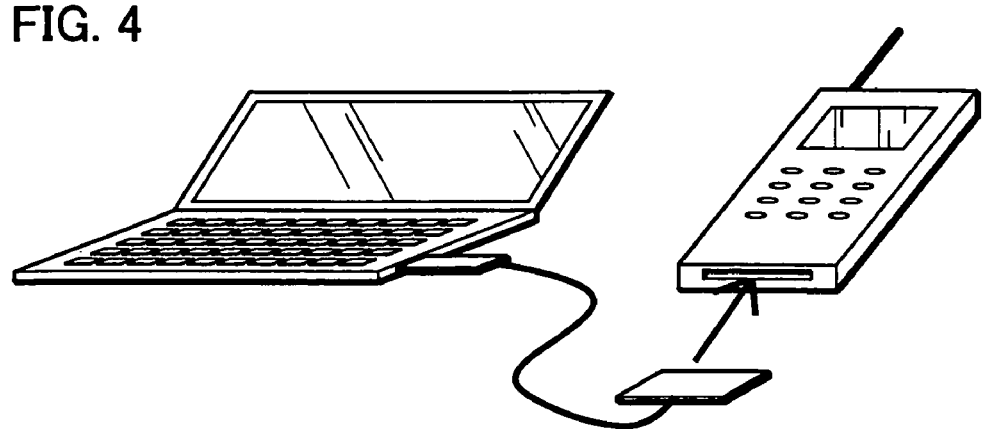
FIG. 4 is a diagram for explaining a mode of using the radio communication device on a desk.
Figure 5:
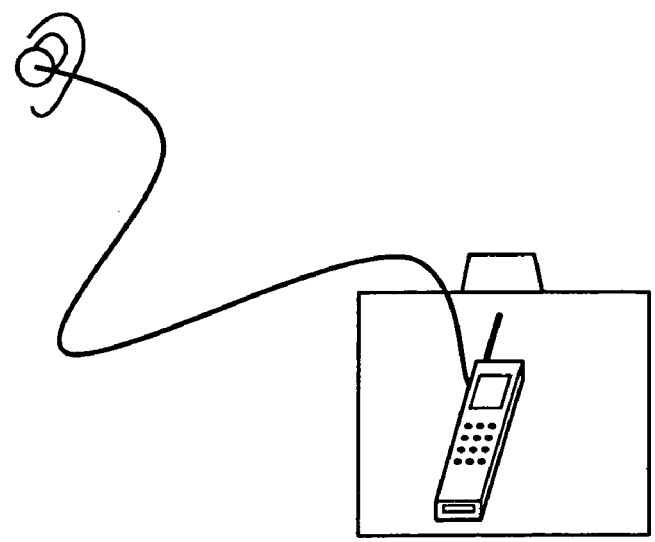
FIG. 5 is a diagram for explaining a mode of using the radio communication device in a bag.
Figure 6:
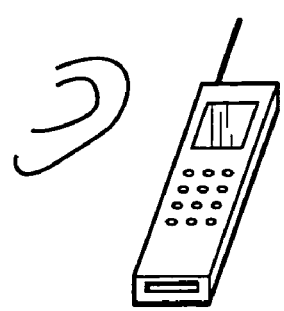
FIG. 6 is a diagram for explaining a mode of using the radio communication device which is applied to an ear of the user.

Referring to FIG. 3, the components of radio communication device 1 operate as follows. It is assumed here that there are total three usage modes of the radio communication device 1; a mode of using radio communication device 1 on a desk as shown in FIG. 4, a mode of using radio communication device 1 in a bag as shown in FIG. 5, and a mode of using radio communication device 1 by being applied to an ear of the user as shown in FIG. 6.

In radio communication device 1, two connectors 8 and 9 exist. In the case where an external device or the like is connected to connector 8, it is determined that radio communication device 1 is used on a desk. In the case where the external device or the like is connected to connector 9, it is determined that radio communication device 1 is used in a bag. In the case where no external device is connected to any of connectors 8 and 9, it is determined that the user uses ratio communication device 1 by applying it to his/her ear. The correspondence relations between the connection of an external device or the like and the usage modes are stored in CPU 7. It is assumed that, for example, in usage mode vs. maximum transmission output storing unit 6, a maximum transmission output value "A" is stored in the case of the mode of using radio communication device 1 on a desk, a maximum transmission output value "B" is stored in the case of the mode of using radio communication device 1 in a bag, and a maximum transmission output value "C" is stored in the case of the mode of using radio communication device 1 by being applied to an ear of the user.

Unit 10 for detecting connection of an external device or the like detects a connection state of an external device or the like to connector 8 or 9 (S2). Unit 10 for detecting connection of an external device or the like reports a detection result to CPU 7 (S3). For example, when connection of an external device or the like to connector 8 is detected, unit 10 for detecting connection of an external device or the like reports that "there is connection of an external device or the like to connector 8" to CPU 7.

CPU 7 determines the usage mode in accordance with the report from unit 10 for detecting connection of an external device or the like (S6). For example, when it is reported that "there is connection of an external device or the like to connector 8", CPU 7 determines the mode of using radio communication device 1 on a desk. The relations between the connection states of connectors 8 and 9 and the modes are as described above.

When the mode of using radio communication device 1 on a desk is determined ("mode of using radio communication device 1 on a desk" in S6), CPU 7 obtains the maximum transmission output value of "A" from usage mode vs. maximum transmission output storing unit 6 (S8).

When the mode of using radio communication device 1 in a bag is determined ("mode of using radio communication device 1 in a bag" in S6), CPU 7 obtains the maximum transmission output value of "B" from usage mode vs. maximum transmission output storing unit 6 (S10).

When the mode of using radio communication device 1 by being applied to an ear of the user is determined ("mode of using the radio communication device 1 by being applied to an ear of the user" in S6), CPU 7 obtains the maximum transmission output value of "C" from user mode maximum transmission output correspondence storing unit 6 (S12).

According to the instruction of CPU 7, control circuit 3 sets the maximum transmission output value obtained by the process in any of S8 to S12 into output control circuit 4 (S14). After that, the radio communication process is continued (S16).

The above-described process is always performed in the background or by an interrupting process using a timer separately from the communication of the radio communication device.

According to the embodiment, even when the usage mode is changed by connection of an external device or the like, it can be controlled so that the maximum output power from the antenna becomes the optimum value.

According to the usage mode such as a case of using the radio communication device on a desk, the case of using the radio communication device in a bag, or the case of using the radio communication device by being applied to an ear of the user, the maximum output power from the antenna can be controlled to be the optimum power.

Further, the processes shown in FIG. 3 are always performed in the background or by an interrupting process using a timer separately from the communication of the radio communication device. Consequently, the optimum maximum output power can be output from the antenna always in response to a change in the usage mode.

Second Embodiment

A radio communication device according to a second embodiment of the present invention has a hardware configuration similar to that of the radio communication device described by referring to FIG. 2. Consequently, the detailed description will not be repeated here.

In the first embodiment, the process of recognizing the usage mode is always performed in the background or by the timer interrupting process. In the second embodiment, the process of recognizing the usage mode is performed before a response to an incoming call or before transmission of a call originating request.

Figure 7:
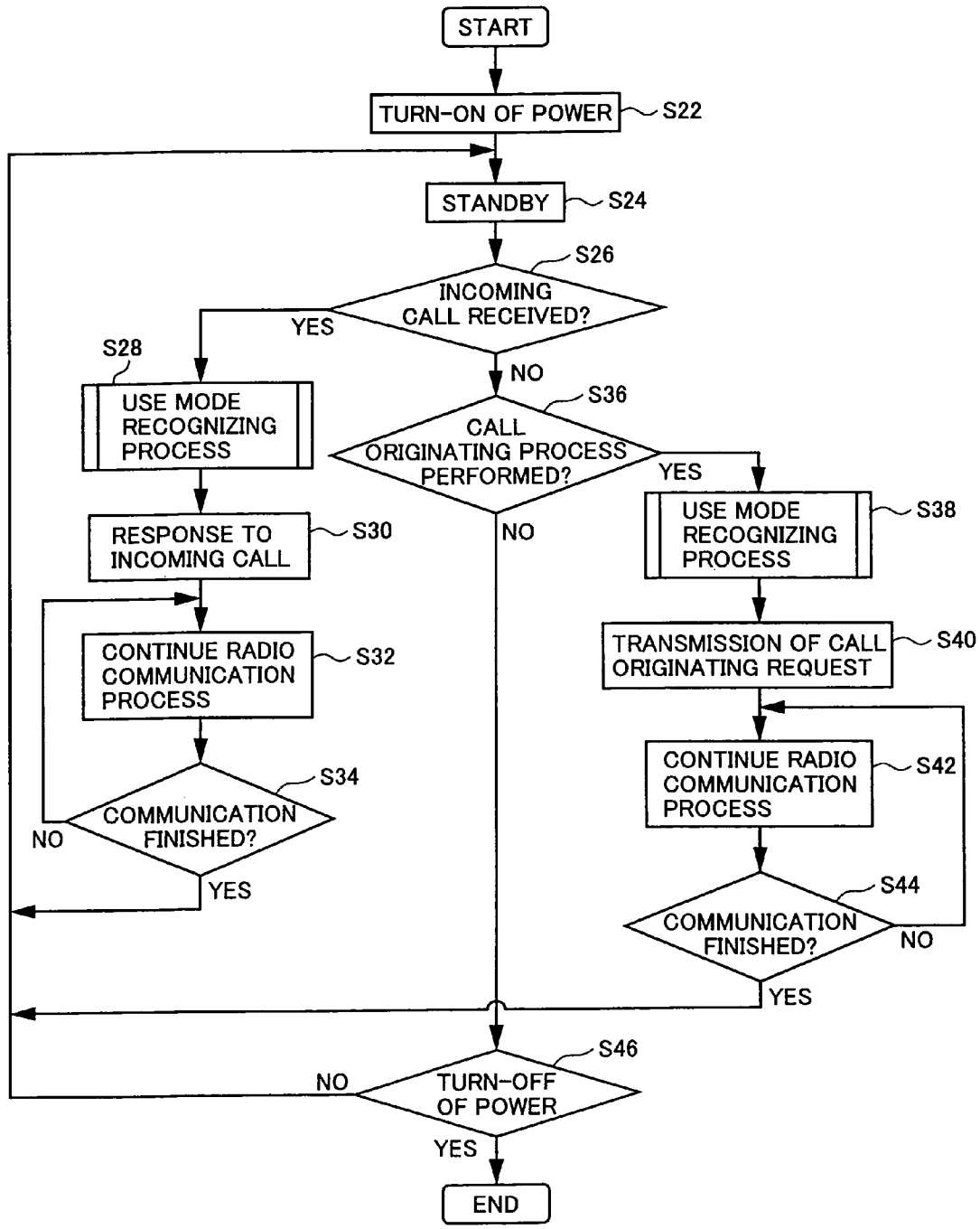
FIG. 7 is a flow chart of processes executed by a radio communication device according to a second embodiment.

Referring to FIG. 7, components of a radio communication device 1 operate as follows.

When the power of radio communication device 1 is turned on (S22), radio communication device 1 shifts to a standby mode (S4). A control circuit 3 determines whether radio communication device 1 has received an incoming call or not (S26). When the radio communication device 1 has received an incoming call (YES in S26), in a CPU 7, the usage mode recognizing process for recognizing the usage mode of radio communication device 1 is executed (S28). The usage mode recognizing process will be described hereinafter.

After S28, radio communication device 1 responds to the incoming call (S30) and continues the radio communicating process (S32). Control circuit 3 determines whether the communication has finished or not (S34). If the communication is not finished (NO in S34), the routine returns to S32. If the communication has been finished (YES in S34), the routine returns to S24 and the standby mode is set again.

If radio communication device 1 has not received an incoming call (NO in S26), control circuit 3 determines whether a call originating operation is performed by the user or not (S36). When it is determined that the call originating operation is performed (YES in S36), a usage mode recognizing process similar to S28 is executed (S38). After S38, a call originating request is transmitted from a transmission circuit 2 (S40). After that, the radio communication process is continued (S42). Control circuit 3 determines whether communication has been finished or not (S44). If the communication has not been finished (NO in S44), the routine returns to S42. If the communication has been finished (YES in S44), the routine returns to S24, and the standby mode is set again.

If there is no incoming call nor call originating operation (NO in S26 and NO in S36), control circuit 3 determines whether the power source of radio communication device 1 has been turned off or not (NO in S46). If the power source of radio communication device 1 has not been turned off (NO in S46), the routine returns to S24 and the standby mode is set again. If the power source of radio communication device 1 is turned off (YES in S46), the process is finished.

Figure 8:
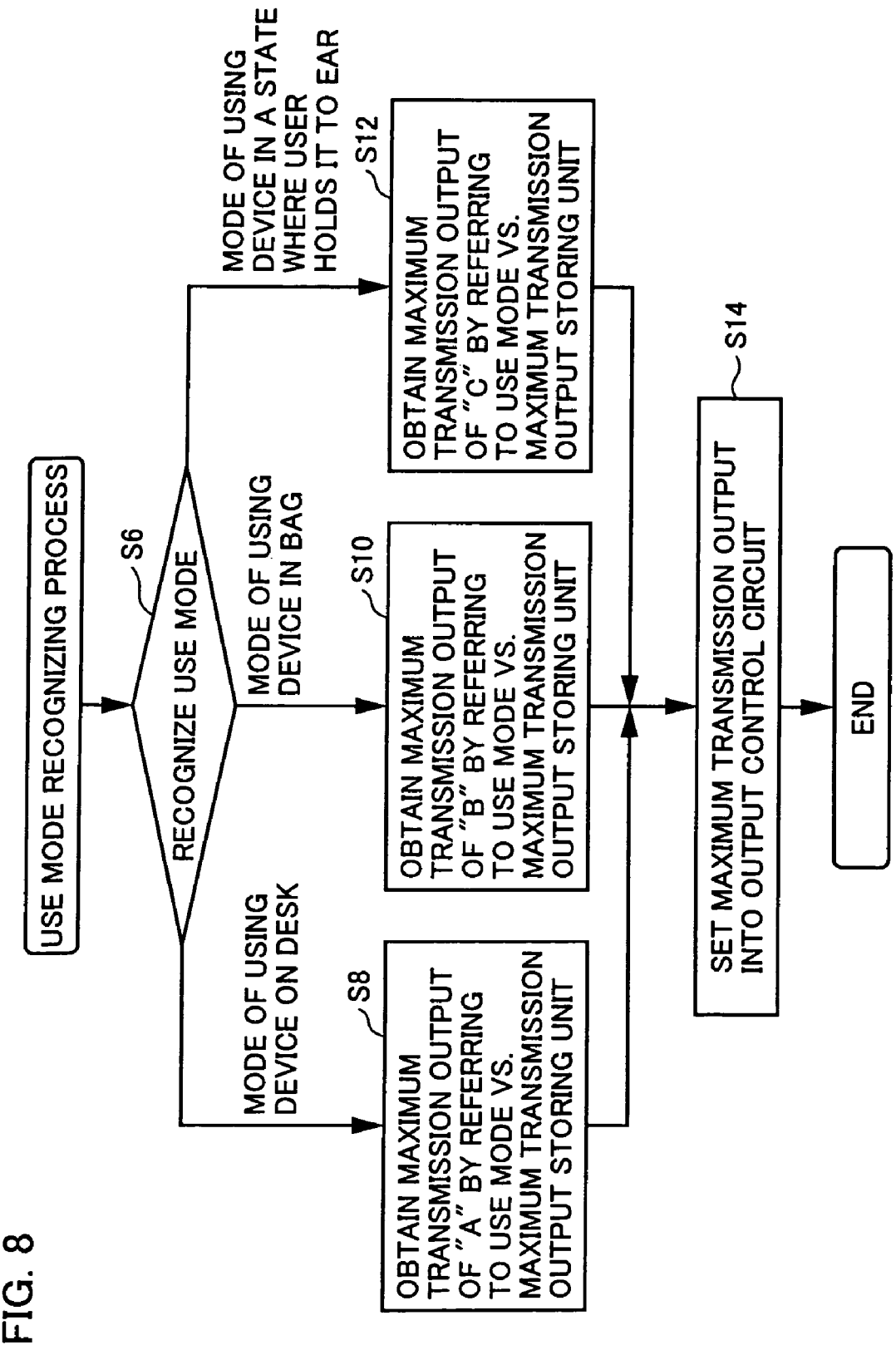
FIG. 8 is a flow chart of a usage mode recognizing process of S28 and S38 in FIG. 7.

Referring to FIG. 8, the usage mode recognizing process in S28 and S38 in FIG. 7 will be described. The process is a process of recognizing the usage mode of radio communication device 1 and setting the proper maximum transmission output value into an output control circuit 4. The details of the process are similar to those of the processes of S6 to S14 in FIG. 3. Consequently, the detailed description will not be repeated here.

According to the embodiment, the usage mode recognizing process is performed only before response to an incoming call or before transmission of a call originating request. Consequently, in the case of a radio communication device whose usage mode is not changed during communication, the number of times of performing the usage mode recognizing process can be reduced as compared with the first embodiment. As a result, the power consumption of the radio communication device can be reduced.

Third Embodiment

A radio communication device according to a third embodiment of the present invention has a hardware configuration similar to that of the radio communication device described by referring to FIG. 2. Consequently, the detailed description will not be repeated here.

In the first embodiment, the process of recognizing the usage mode is always performed in the background or by a timer interrupting process. In the third embodiment, the process of recognizing the usage mode is performed at turn-on of the power source.

Figure 9:
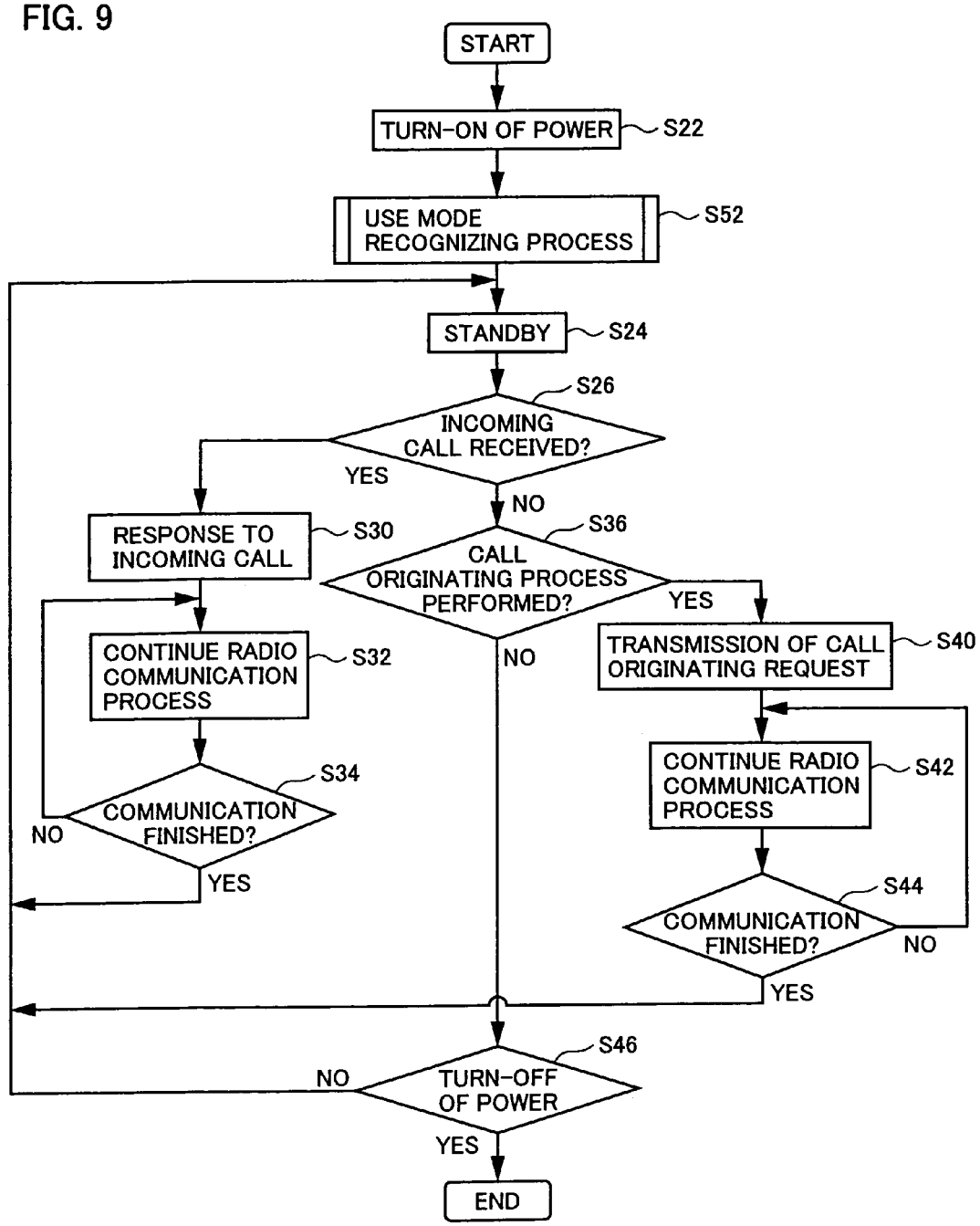
FIG. 9 is a flow chart of processes executed by a radio communication device according to a third embodiment.

Referring to FIG. 9, components of a radio communication device 1 operate as follows.

When the power source of radio communication device 1 is turned on (S22), a usage mode recognizing process (S52) is performed. The usage mode recognizing process is similar to that described by referring to FIG. 8, so that its description will not be repeated here.

After the usage mode recognizing process (S52), radio communication device 1 shifts to a standby mode (S24). The processes after the shift to the standby mode are similar to those in FIG. 7 except for the usage mode recognizing process in S28 and S38. Consequently, the detailed description will not be repeated here.

According to the third embodiment, the usage mode recognizing process is performed only when the power source of radio communication device 1 is turned on. Consequently, in the case of the radio communication device whose usage mode is not changed after the turn-on of the power, the number of times of performing the usage mode recognizing process can be reduced as compared with the first and second embodiments. As a result, the power consumption of the radio communication device can be reduced.

Fourth Embodiment

Figure 10:
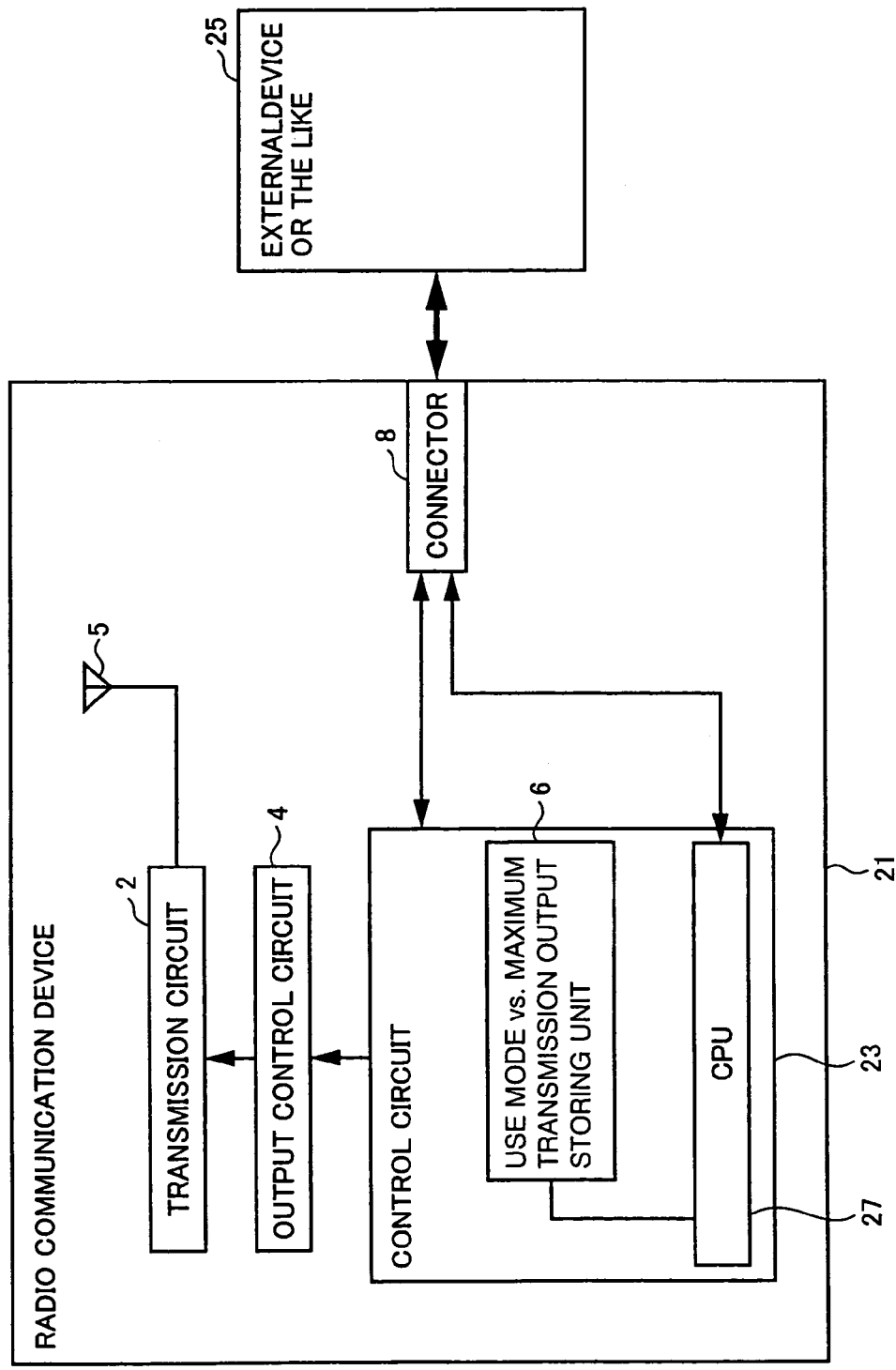
FIG. 10 is a block diagram showing the hardware configuration of a radio communication device according to a fourth embodiment.

With reference to FIG. 10, a radio communication device 21 according to a fourth embodiment of the present invention includes an antenna 5, a transmission circuit 2 connected to antenna 5, for transmitting an output signal from antenna 5, an output control circuit 4 connected to transmission circuit 2, for controlling an output of transmission circuit 2, a connector 8, and a control circuit 23 connected to connector 8 and output control circuit 4, for controlling output control circuit 4 on the basis of the connection state of an external device 25 or the like to connector 8.

Control circuit 23 includes a usage mode vs. maximum transmission output storing unit 6 for storing a plurality of maximum transmission outputs which are predetermined in accordance with a plurality of usage modes of radio communication device 21, and a CPU 27 connected to usage mode vs. maximum transmission output storing unit 6 and connector 8, which executes processes according to a flow chart to be described hereinafter in accordance with the connection state of external device 25 or the like to connector 8 to thereby control output control circuit 4.

CPU 27 performs communications with an external device or the like connected to the connector and, on the basis of the information, recognizes the usage mode of a radio communication device 21.

Figure 11:
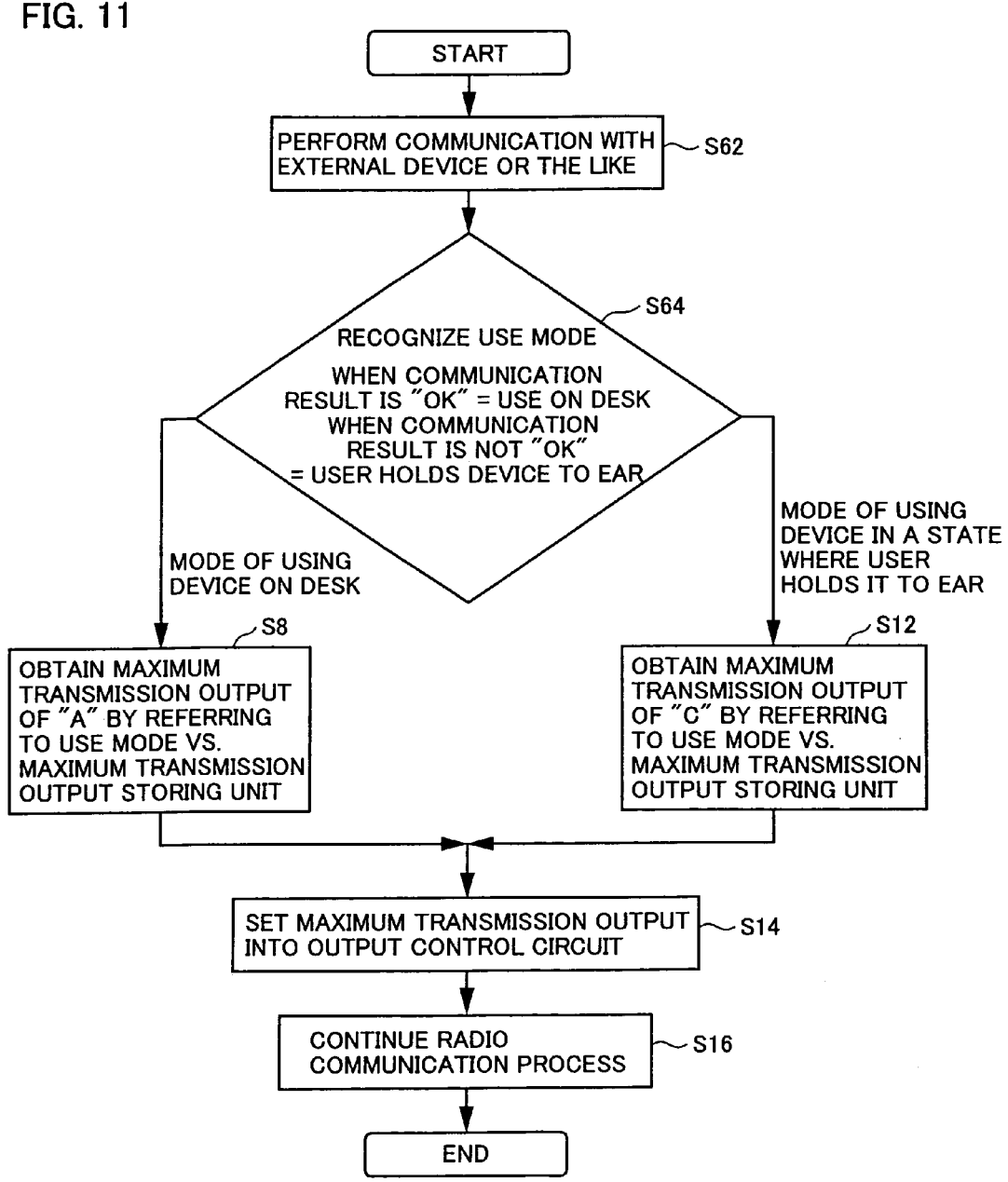
FIG. 11 is a flowchart showing processes executed by the radio communication device according to the fourth embodiment.

Referring to FIG. 11, the components of radio communication device 21 operate as follows.

It is now assumed that, as usage modes, there are two modes of a mode of using the radio communication device on a desk and a mode of using the radio communication device by being applied to an ear of the user.

For example, when a camera unit is connected as an external device to connector 8 and radio communication device 21 is used as a TV telephone by using the camera unit, an image of the user himself/herself has to be captured by the camera. In such a case, the mode of using the radio communication device on a desk can be considered.

On the other hand, when the mode of using the radio communication device on a desk cannot be determined only from connection of the camera unit to connector 8, for example, in the case where the radio communication device to which the camera unit is attached is not used as a TV telephone but only voice is transmitted/received, the mode of using the radio communication device by being applied to an ear of the user is determined.

When radio communication device 21 and the camera unit are used as a TV telephone, it is necessary to capture image data from the camera unit. At the time of capturing image data, a data passing process (hereinafter, referred to as "handshake operation") for checking whether connection of data between radio communication device 21 and the camera unit is successful or not is performed. In the case where the handshake operation is performed between radio communication device 21 and the camera unit, the mode of using radio communication device 21 on a desk is determined. In the other cases, it is considered that the user uses radio communication device 21 by holding it by a hand and applying it to his/her ear.

It is assumed that the correspondence relation between the result of communication with external device 25 or the like and the usage mode is previously stored in CPU 27. In usage mode vs. maximum transmission output storing unit 6, a maximum output value of "A" is stored in the case of the mode of using the radio communication device on a desk and a maximum output value of "C" is stored in the case of the usage mode in which the user holds the radio communication device to his/her ear.

CPU 27 performs communication with external device 25 or the like via connector 8 (S62).

CPU 27 recognizes the usage mode as a result of the handshake operation (S64). When CPU 27 succeeds in the handshake operation, CPU 27 determines that radio communication device 21 is used on a desk ("the mode of using the radio communication device on a desk" in S64), and the maximum transmission output value of "A" is obtained from usage mode vs. maximum transmission output storing unit 6 (S8). If the handshake operation fails or no handshake operation is performed, CPU 27 determines that the user uses radio communication device 21 while holding it to his/her ear ("the usage mode in which the user holds the radio communication device to his/her ear" in S64), and the maximum transmission output value of "C" is obtained from usage mode vs. maximum transmission output storing unit 6 (S12).

According to an instruction of a CPU 27, control circuit 33 sets the maximum transmission output value obtained in the process of S8 or S12 into output control circuit 4 (S14). After that, the radio communication process is continued (S16).

According to the embodiment, by performing communication with an external device or the like, it becomes possible to output the optimum maximum output power from the antenna.

Fifth Embodiment

Figure 12:
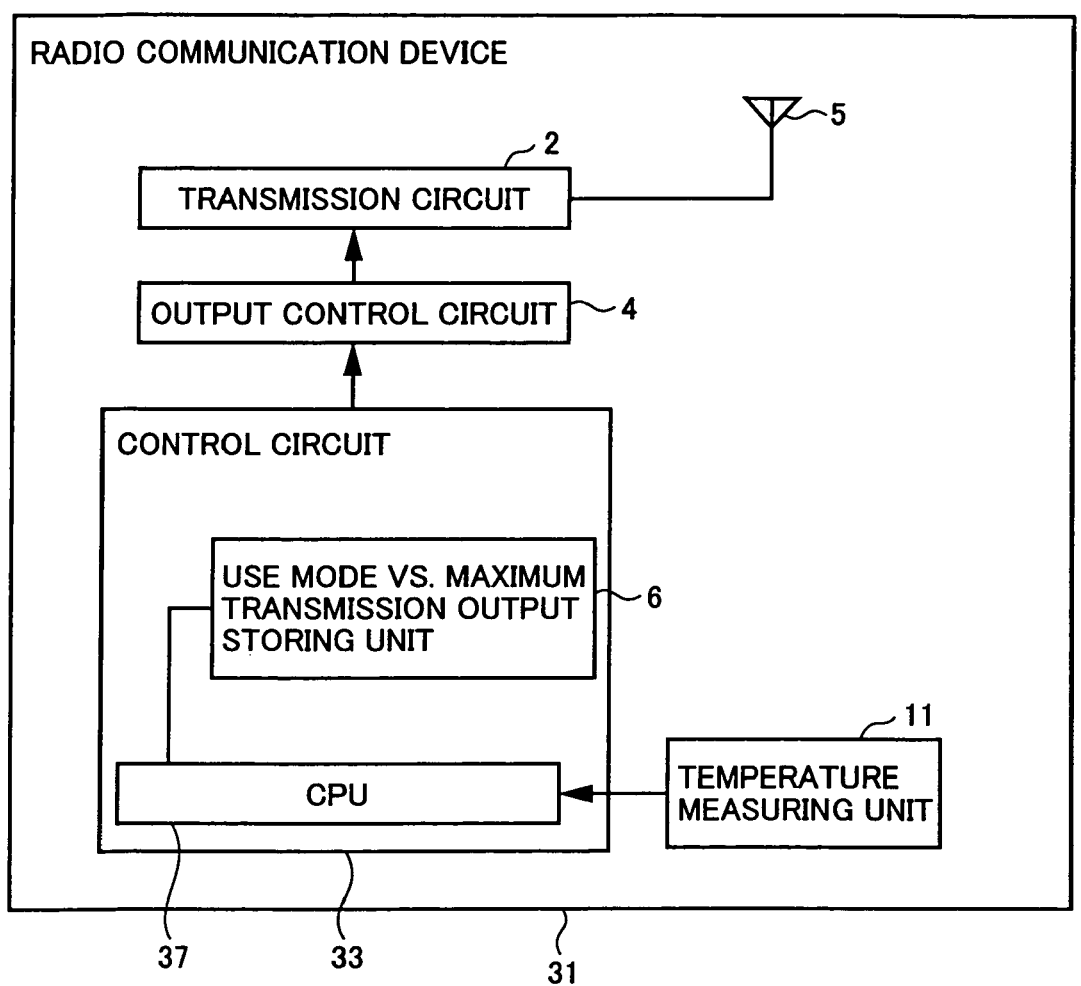
FIG. 12 is a block diagram showing the hardware configuration of a radio communication device according to a fifth embodiment.

Referring to FIG. 12, a radio communication device 31 according to a fifth embodiment of the present invention includes an antenna 5, an transmission circuit 2 connected to antenna 5, for transmitting an output signal from antenna 5, an output control circuit 4 connected to transmission circuit 2, for controlling an output of transmission circuit 2, a temperature measuring unit 11 for measuring either temperature in the periphery of radio communication device 31 or temperature of the surface of radio communication device 31, and a control circuit 33 connected to temperature measuring unit 11 and output control circuit 4, for controlling output control circuit 4 on the basis of an output result of temperature measuring unit 11.

Control circuit 33 includes a usage mode vs. maximum transmission output storing unit 6 for storing a plurality of maximum transmission outputs which are predetermined in accordance with a plurality of usage modes of radio communication device 31, and a CPU 37 connected to usage mode vs. maximum transmission output storing unit 6 and temperature measuring unit 11, which executes processes according to a flow chart to be described hereinafter in accordance with the output result of temperature measuring unit 11 to thereby control output control circuit 4.

Figure 13:
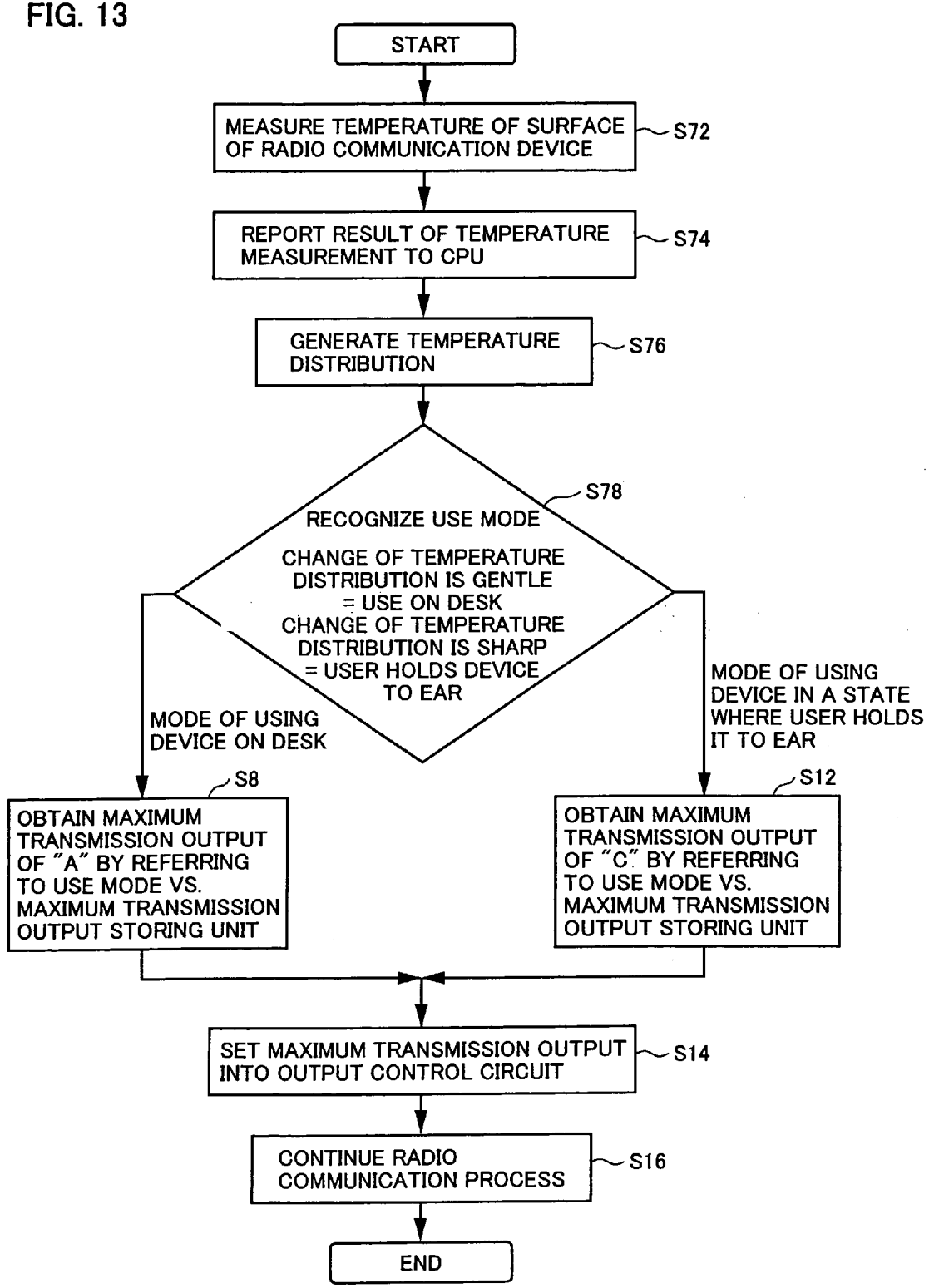
FIG. 13 is a flow chart showing processes executed by the radio communication device according to the fifth embodiment.

Referring to FIG. 13, the components of the radio communication device 31 operate as follows.

It is now assumed that, as usage modes, there are two modes of a mode of using the radio communication device on a desk and a usage mode in which the user holds the radio communication device to his/her ear.

The temperature of the surface of the radio communication device 31 is measured, and the distribution of the temperatures is checked. If the temperature distribution has a gentle change, it is determined that radio communication device 31 is used in a state where it is put on a desk. If the temperature distribution sharply changes in some positions, it is considered that radio communication device 31 is used by being held by his/her hand and held to his/her ear.

It is assumed that the reference used to determine the degree of a change in the temperature distribution is preset in CPU 37, and the correspondence relation between the distribution of the temperatures of the surface of radio communication device 31 and the usage mode is stored in CPU 37. It is assumed that, in usage mode vs. maximum transmission output storing unit 6, a maximum output value of "A" is stored in the case of using the radio communication device on a desk, and a maximum output value of "C" is stored in the case of the usage mode in which the user holds the radio communication device to his/her ear.

Temperature measuring unit 11 measures the temperature of the surface of radio communication device 31 (S72), and reports the measured temperature to CPU 37 (S74). CPU 37 generates a distribution of temperatures of the surface of radio communication device 31 on the basis of the temperature measured by temperature measuring unit 11 (S76).

CPU 37 determines whether the change in the distribution of the surface temperature of radio communication device 31 is gentle or sharp (S78). When the surface temperature distribution is gentle, CPU 37 determines that radio communication device 31 is used on a desk ("mode of using the radio communication device on a desk" in S78), and the maximum transmission output value of "A" is obtained from usage mode vs. maximum transmission output storing unit 6 (S8). When the surface temperature distribution is sharp, CPU 37 determines that the user uses radio communication device 31 by holding it to his/her ear ("mode in which the user uses the radio communication device by holding it to his/her ear" in S78), and the maximum transmission output value of "C" is obtained from usage mode vs. maximum transmission output storing unit 6 (S12).

According to the instruction of CPU 37, control circuit 33 sets the maximum transmission output value obtained by the process of S8 or S12 into output control circuit 4 (S14). After that, the radio communication process is continued (S16).

According to the embodiment, in the case where the temperature of the periphery or the temperature of the surface of the radio communication device changes according to a usage mode, the optimum maximum output power can be output from the antenna.

Sixth Embodiment

Figure 14:
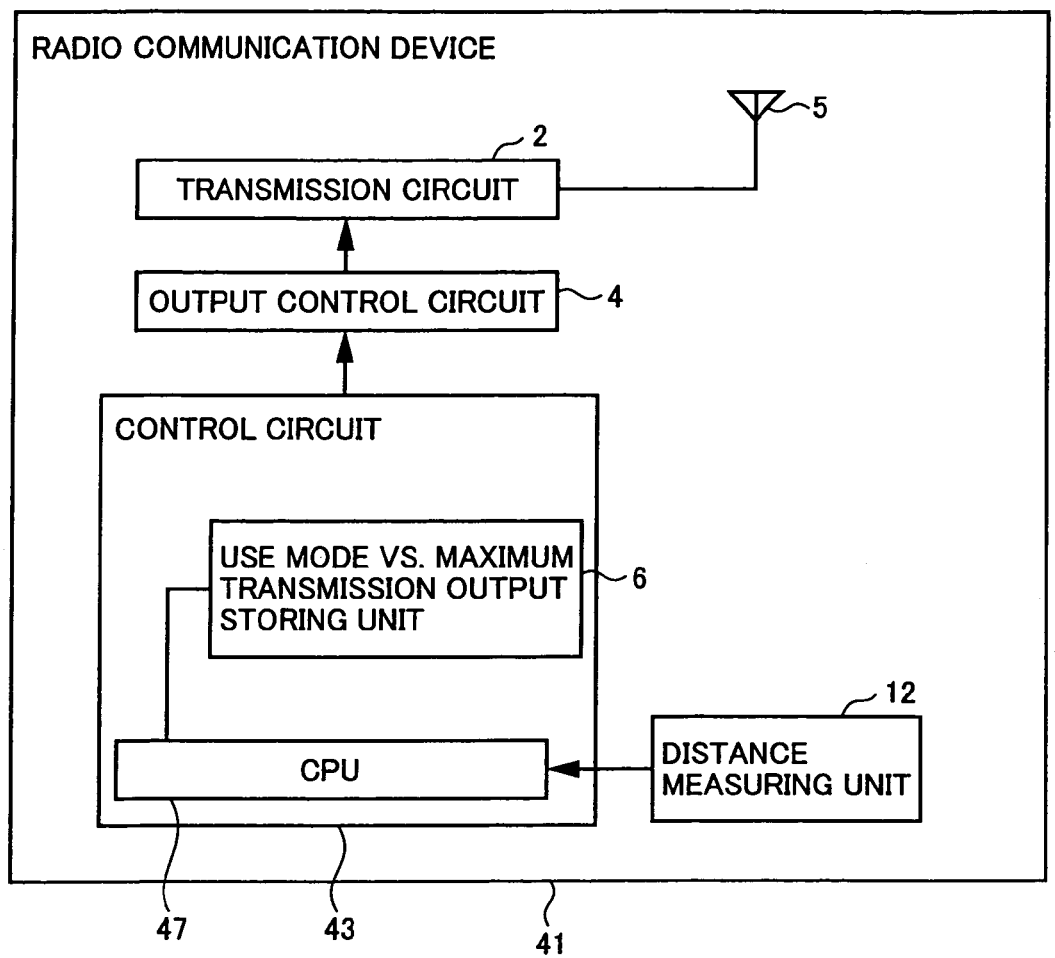
FIG. 14 is a block diagram showing the hardware configuration of a radio communication device according to a sixth embodiment.

Referring to FIG. 14, a radio communication device 41 according to a sixth embodiment of the present invention includes an antenna 5, a transmission circuit 2 connected to antenna 5, for transmitting an output signal from antenna 5, an output control circuit 4 connected to transmission circuit 2, for controlling an output of transmission circuit 2, a distance measuring unit 12 for measuring the distance from radio communication device 41 to an obstacle, and a control circuit 43 connected to distance measuring unit 12 and output control circuit 4, for controlling output control circuit 4 on the basis of an output result of distance measuring unit 12.

Control circuit 43 includes a usage mode vs. maximum transmission output storing unit 6 for storing a plurality of maximum transmission outputs which are predetermined in accordance with a plurality of usage modes of radio communication device 41, and a CPU 47 connected to usage mode vs. maximum transmission output storing unit 6 and distance measuring unit 12, which executes processes according to a flow chart to be described hereinafter in accordance with the output result of distance measuring unit 12 to thereby control output control circuit 4.

Distance measuring unit 12 reports the measured distance from radio communication device 41 to the obstacle to CPU 47, and CPU 47 recognizes the usage mode on the basis of the information from distance measuring unit 12. An example of a distance measuring method is a method of transmitting infrared, light, sound, or the like from radio communication device 41, measuring time taken for the infrared, light, sound, or the like reflected by the obstacle and returned to radio communication device 41, and obtaining the distance from the time.

Figure 15:
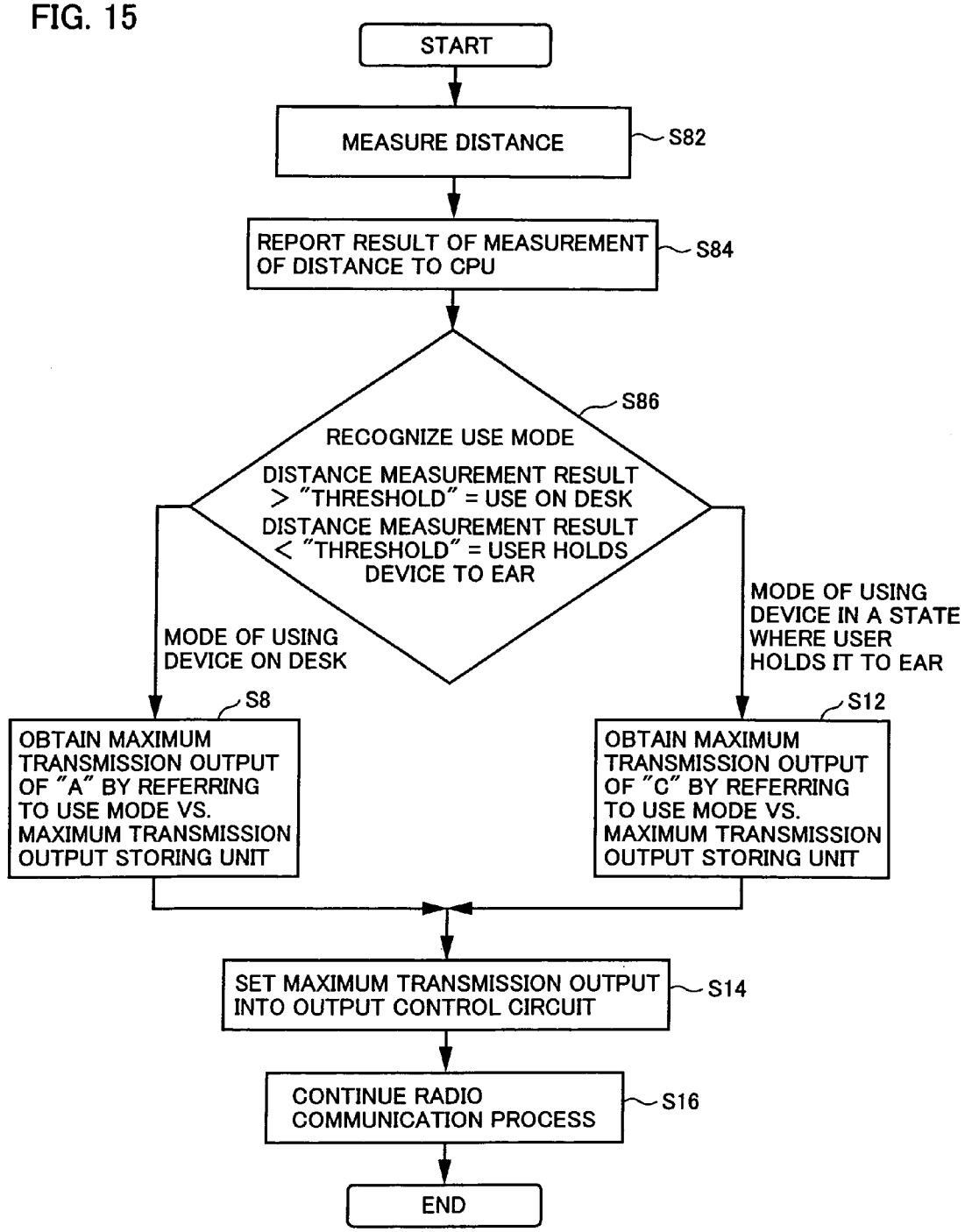
FIG. 15 is a flow chart showing processes executed by the radio communication device according to the sixth embodiment.

Referring to FIG. 15, the components of radio communication device 41 operate as follows.

It is now assumed that, as usage modes, there are two modes of a mode of using the radio communication device on a desk and a usage mode in which the user holds the radio communication device to his/her ear.

When the distance between radio communication device 41 and an obstacle (for example, the user) is equal to or longer than a predetermined threshold, it is considered that radio communication device 41 is used on a desk. When the distance is smaller than the threshold, it is considered that the user holds radio communication device 41 by his/her hand to his/her ear.

It is assumed that the threshold is preset in CPU 47 and the correspondence relation between the distance from radio communication device 41 to an obstacle and the usage mode is stored in CPU 47. It is assumed that, in usage mode vs. maximum transmission output storing unit 6, the maximum output value of "A" is stored in the case of using the radio communication device on a desk, and the maximum output value of "C" is stored in the case of the usage mode in which the user holds the radio communication device to his/her ear.

Distance measuring unit 12 measures the distance from radio communication device 41 to the obstacle (S82), and reports the distance measurement result to CPU 47 (S84). CPU 47 determines whether or not the result of measuring the distance is equal to or longer than the predetermined threshold (S86). When the distance measurement result is equal to or longer than the threshold, CPU 47 determines that radio communication device 41 is used on a desk ("mode of using the radio communication device on a desk" in S86), and the maximum transmission output value of "A" is obtained from usage mode vs. maximum transmission output storing unit 6 (S8). When the distance measurement result is less than the threshold, CPU 47 determines that the user uses radio communication device 41 by holding it to his/her ear ("mode in which the user uses the radio communication device by holding it to his/her ear" in S86), and the maximum transmission output value of "C" is obtained from usage mode vs. maximum transmission output storing unit 6 (S12).

According to the instruction of CPU 47, control circuit 43 sets the maximum transmission output value obtained by the process of S8 or S12 into output control circuit 4 (S14). After that, the radio communication process is continued (S16).

According to the embodiment, in the case where the distance between the radio communication device and an obstacle (for example, the user) changes according to a usage mode, by measuring the distance from the radio communication device to the obstacle (for example, the user), it becomes possible to output the optimum maximum output power from the antenna.

Seventh Embodiment

Figure 16:
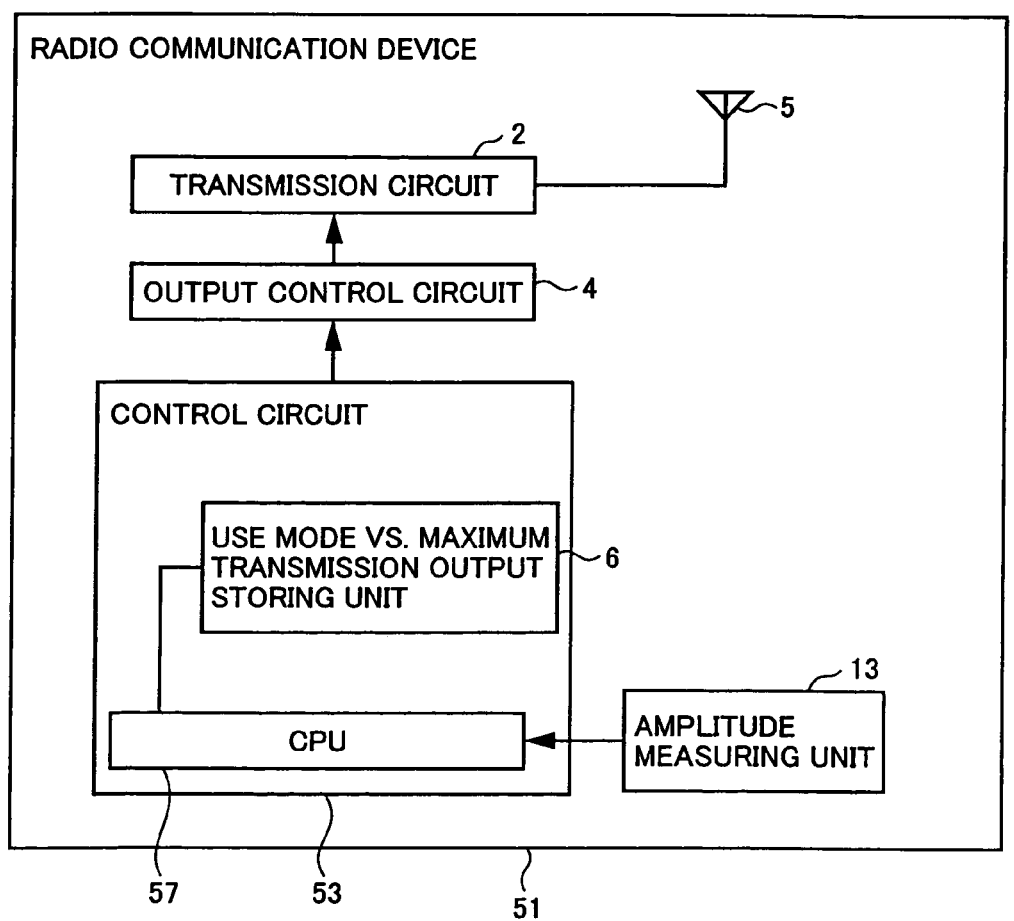
FIG. 16 is a block diagram showing the hardware configuration of a radio communication device according to a seventh embodiment.

With reference to FIG. 16, a radio communication device 51 according to a seventh embodiment of the present invention includes an antenna 5, a transmission circuit 2 connected to antenna 5, for transmitting an output signal from antenna 5, an output control circuit 4 connected to transmission circuit 2, for controlling an output of transmission circuit 2, an amplitude measuring unit 13 for measuring an amplitude of oscillation of radio communication device 51, and a control circuit 53 connected to amplitude measuring unit 13 and output control circuit 4, for controlling output control circuit 4 on the basis of an output result of amplitude measuring unit 13.

Control circuit 53 includes a usage mode vs. maximum transmission output storing unit 6 for storing a plurality of maximum transmission outputs which are predetermined in accordance with a plurality of usage modes of radio communication device 51, and a CPU 57 connected to usage mode vs. maximum transmission output storing unit 6 and amplitude measuring unit 13, which executes processes according to a flow chart to be described hereinafter in accordance with the output result of amplitude measuring unit 13 to thereby control output control circuit 4.

Figure 17:
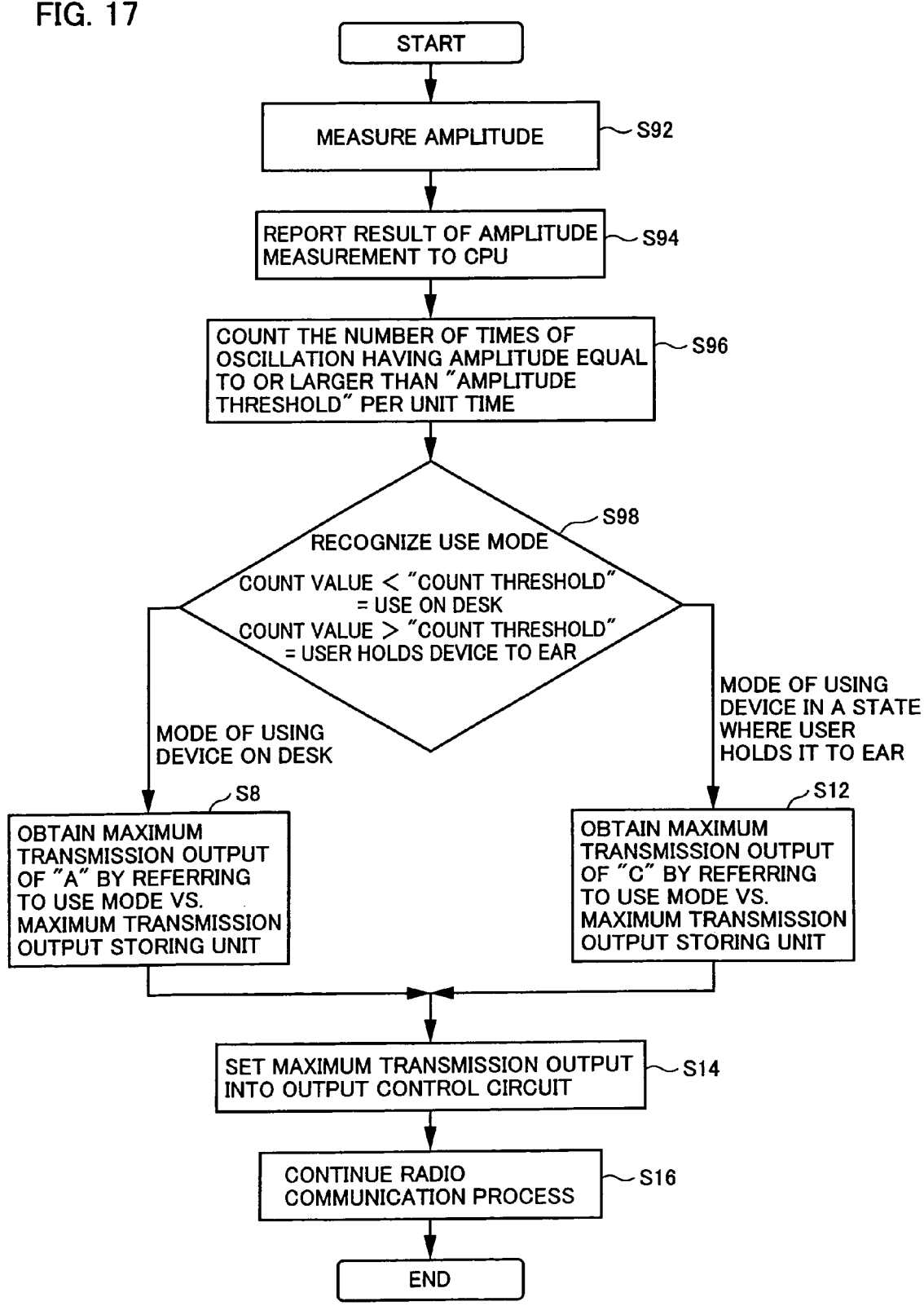
FIG. 17 is a flow chart of processes executed by the radio communication device according to the seventh embodiment.

Referring to FIG. 17, the components of radio communication device 51 operate as follows.

It is now assumed that, as usage modes, there are two modes of a mode of using the radio communication device on a desk and a usage mode in which the user holds the radio communication device to his/her ear.

The amplitude of radio communication device 51 is measured, and the number of times when radio communication device 51 oscillates with an amplitude equal to or larger than a predetermined amplitude threshold per unit time is counted. If the number of oscillation times of radio communication device 51 is smaller than the predetermined count threshold, it is considered that radio communication device 51 is used in a state where it is put on a desk. If the number of oscillation times is equal to or larger than the count threshold, it is considered that radio communication device 51 is used in a state where the user has radio communication device 51 by his/her hand and holds it to his/her ear.

It is assumed that the unit time, amplitude threshold, and count threshold are preset in CPU 57, and the correspondence relation between the number of amplitude times and the usage mode is previously stored in CPU 57. It is assumed that, in usage mode vs. maximum transmission output storing unit 6, the maximum output value of "A" is stored in the case of using the radio communication device on a desk, and the maximum output value of "C" is stored in the case of the usage mode in which the user holds the radio communication device to his/her ear.

Amplitude measuring unit 13 measures the amplitude of oscillation of radio communication device 51 (S92), and reports the amplitude measurement result to CPU 57 (S94). CPU 57 counts the number of times radio communication device 51 oscillates with an amplitude which is equal to or larger than the amplitude threshold per unit time (S96). CPU 57 determines whether the number of times is smaller than the count threshold value or not (S98). When the number of times is smaller than the count threshold, CPU 57 determines that radio communication device 51 is used on a desk ("mode of using the radio communication device on a desk" in S98), and the maximum transmission output value of "A" is obtained from usage mode vs. maximum transmission output storing unit 6 (S8). When the number of times is equal to or larger than the count threshold, CPU 57 determines that the user uses radio communication device 51 by holding it to his/her ear ("mode in which the user uses the radio communication device by holding it to his/her ear" in S98), and the maximum transmission output value of "C" is obtained from usage mode vs. maximum transmission output storing unit 6 (S12).

According to the instruction of CPU 57, control circuit 53 sets the maximum transmission output value obtained by the process of S8 or S12 into output control circuit 4 (S14). After that, radio communication process is continued (S16).

According to the embodiment, in the case where the oscillation of the radio communication device changes according to a usage mode, by measuring the amplitude of the oscillation of the radio communication device, the optimum maximum output power can be output from the antenna.

Eighth Embodiment

Figure 18:
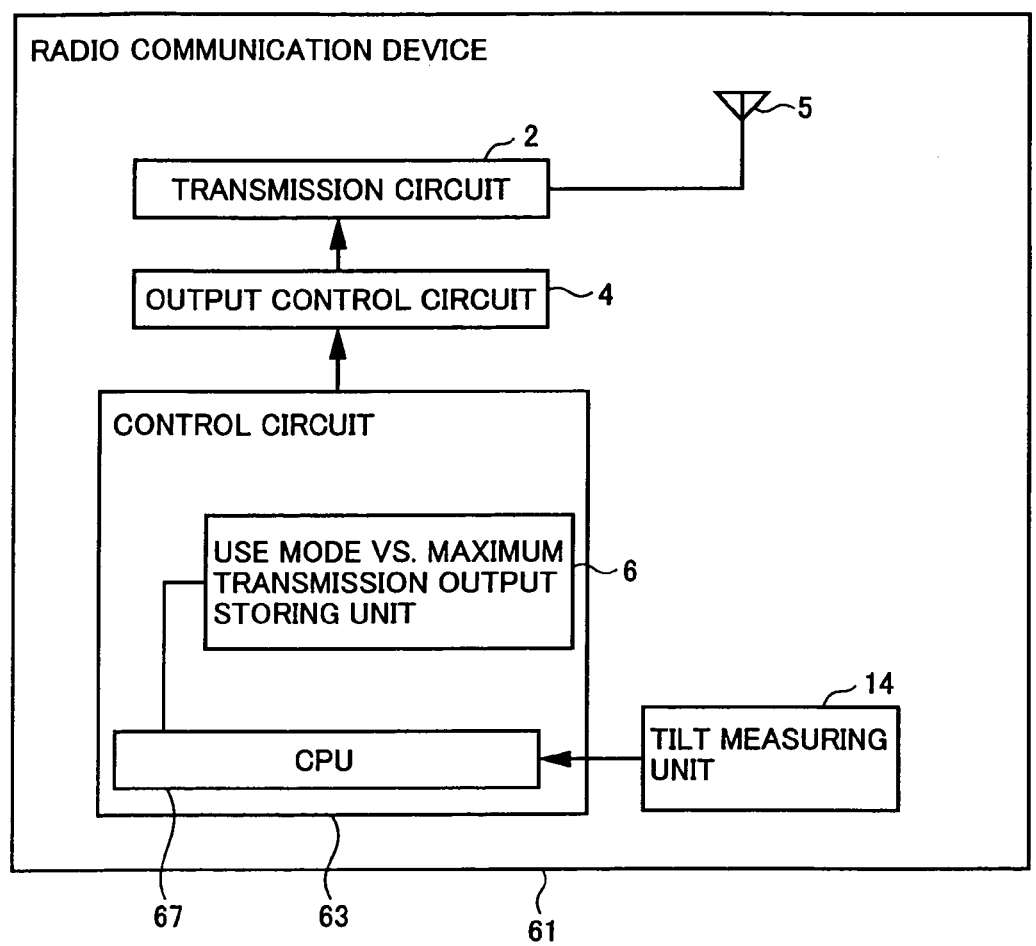
FIG. 18 is a block diagram showing the hardware configuration of a radio communication device according to an eighth embodiment.

Referring to FIG. 18, a radio communication device 61 according to an eighth embodiment of the present invention includes an antenna 5, a transmission circuit 2 connected to antenna 5, for transmitting an output signal from antenna 5, an output control circuit 4 connected to transmission circuit 2, for controlling an output of transmission circuit 2, a tilt measuring unit 14 for measuring tilt of radio communication device 61, and a control circuit 63 connected to tilt measuring unit 14 and output control circuit 4, for controlling output control circuit 4 on the basis of an output result of tilt measuring unit 14.

Control circuit 63 includes a usage mode vs. maximum transmission output storing unit 6 for storing a plurality of maximum transmission outputs which are predetermined in accordance with a plurality of usage modes of the radio communication device 61, and a CPU 67 connected to usage mode vs. maximum transmission output storing unit 6 and tilt measuring unit 14, which executes processes according to a flow chart to be described hereinafter in accordance with the output result of tilt measuring unit 14 to thereby control output control circuit 4.

Figure 19:
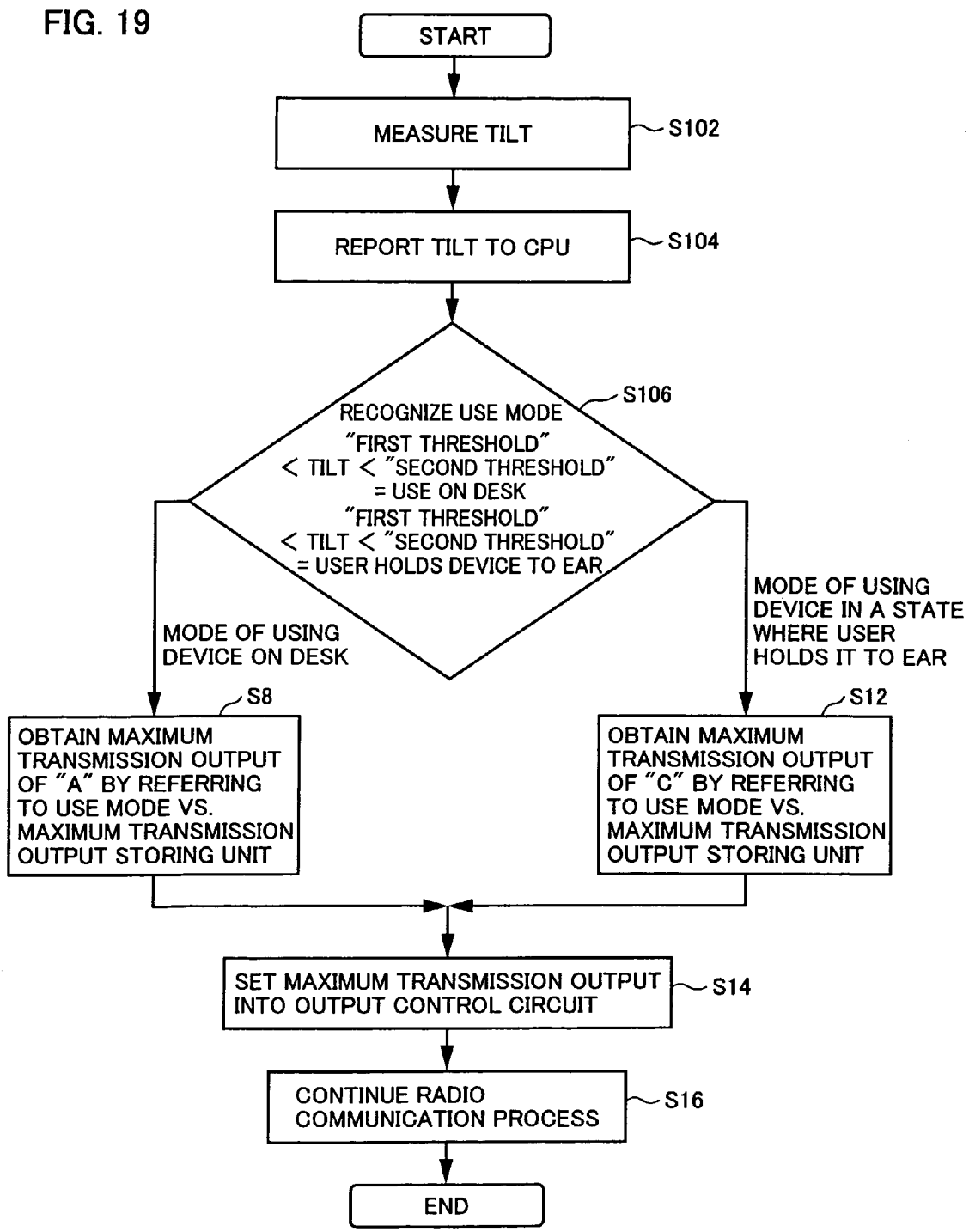
FIG. 19 is a flow chart of processes executed by the radio communication device according to the eighth embodiment.

Referring to FIG. 19, the components of radio communication device 61 operate as follows.

It is now assumed that, as usage modes, there are two modes of a mode of using the radio communication device on a desk and a usage mode in which the user holds the radio communication device to his/her ear.

In the case of using radio communication device 61 on a desk, a dedicated holder for holding radio communication device 61 exists. Consequently, when the tilt of radio communication device 61 is larger than a predetermined first threshold and is smaller than a predetermined second threshold which is larger than the first threshold, it is considered that radio communication device 61 is held in the dedicated holder on a desk. In the other cases, it is considered that radio communication device 61 is used in a state that the user has radio communication device 61 by his/her hand and holds it to his/her ear.

It is assumed that the first and second thresholds are preset in CPU 67, and the correspondence relation between the tilt of radio communication device 61 and the usage mode is previously stored in CPU 67. It is assumed that, in usage mode vs. maximum transmission output storing unit 6, the maximum output value of "A" is stored in the case of using the radio communication device on a desk, and the maximum output value of "C" is stored in the case of the usage mode in which the user holds the radio communication device to his/her ear.

Tilt measuring unit 14 measures the tilt of radio communication device 61 (S102), and reports the tilt to CPU 67 (S104).

CPU 67 determines whether or not the tilt of radio communication device 61 is larger than the first threshold value and smaller than the second threshold (S106). If the tilt of radio communication device 61 is larger than the first threshold and smaller than the second threshold value, CPU 67 determines that the radio communication device 61 is used on a desk ("mode of using the radio communication device on a desk" in S106), and the maximum transmission output value of "A" is obtained from usage mode vs. maximum transmission output storing unit 6 (S8). When the tilt of radio communication device 61 is other than the above, CPU 67 determines that the user uses radio communication device 61 by holding it to his/her ear ("mode in which the user uses the radio communication device by holding it to his/her ear" in S106), and the maximum transmission output value of "C" is obtained from usage mode vs. maximum transmission output storing unit 6 (S12).

According to the instruction of CPU 67, control circuit 63 sets the maximum transmission output value obtained by the process of S8 or S12 into output control circuit 4 (S14). After that, the radio communication process is continued (S16).

According to the embodiment, in the case where the tilt of the radio communication device changes according to a usage mode, by measuring the tilt of the radio communication device, it becomes possible to output the optimum maximum output power from the antenna.

Ninth Embodiment

Figure 20:
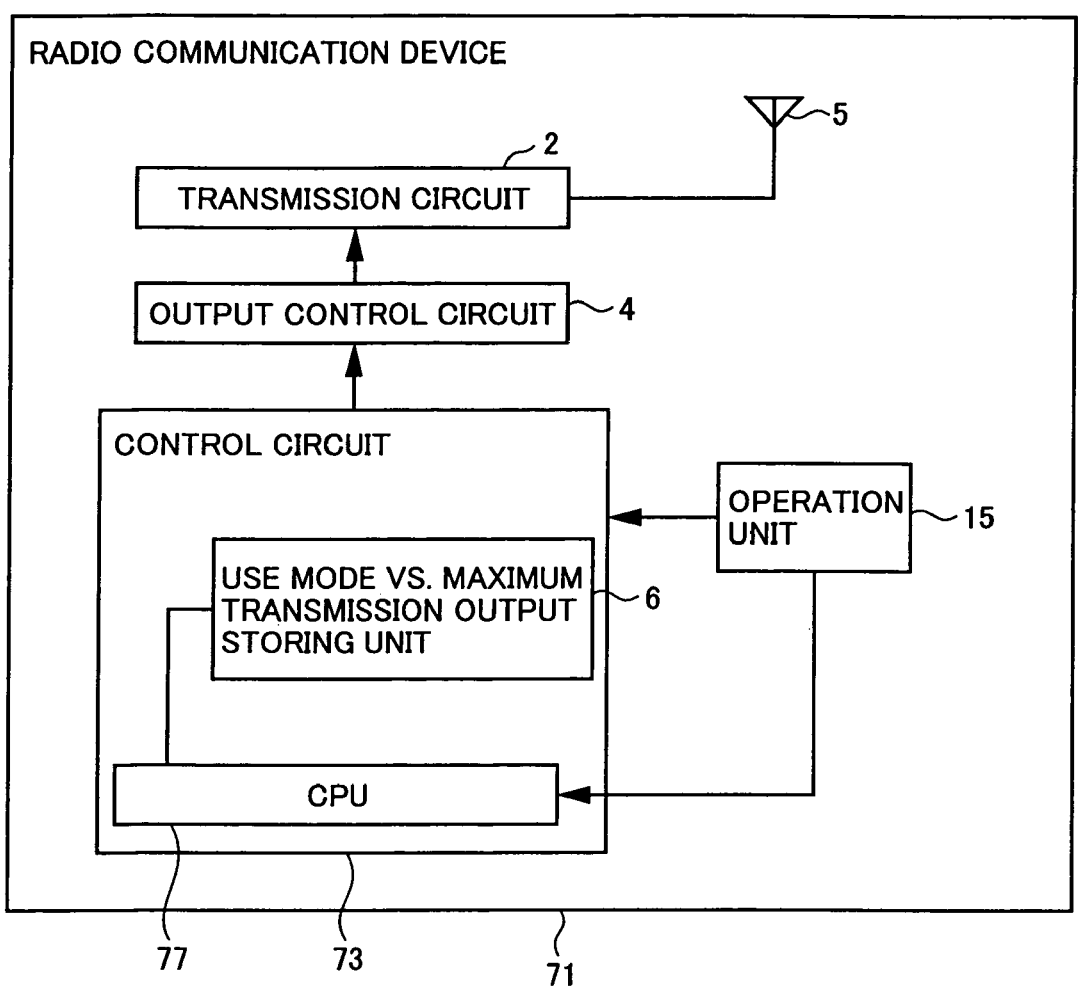
FIG. 20 is a block diagram showing the hardware configuration of a radio communication device according to a ninth embodiment.

Referring to FIG. 20, a radio communication device 71 according to a ninth embodiment of the present invention includes an antenna 0.5, a transmission circuit 2 connected to antenna 5, for transmitting an output signal from antenna 5, an output control circuit 4 connected to transmission circuit 2, for controlling an output of transmission circuit 2, an operation unit 15 for accepting an operation on radio communication device 71, and a control circuit 73 connected to operation unit 15 and output control circuit 4, for controlling output control circuit 4 on the basis of an output result of operation unit 15.

Control circuit 73 includes a usage mode vs. maximum transmission output storing unit 6 for storing a plurality of maximum transmission outputs which are predetermined in accordance with a plurality of usage modes of radio communication device 71, and a CPU 77 connected to usage mode vs. maximum transmission output storing unit 6 and operation unit 15, which executes processes according to a flow chart to be described hereinafter in accordance with the output result of operation unit 15 to thereby control output control circuit 4.

CPU 77 has a function of analyzing an operation performed on radio communication device 71 by the user. On the basis of a result of the analysis, the usage mode is recognized.

Figure 21:
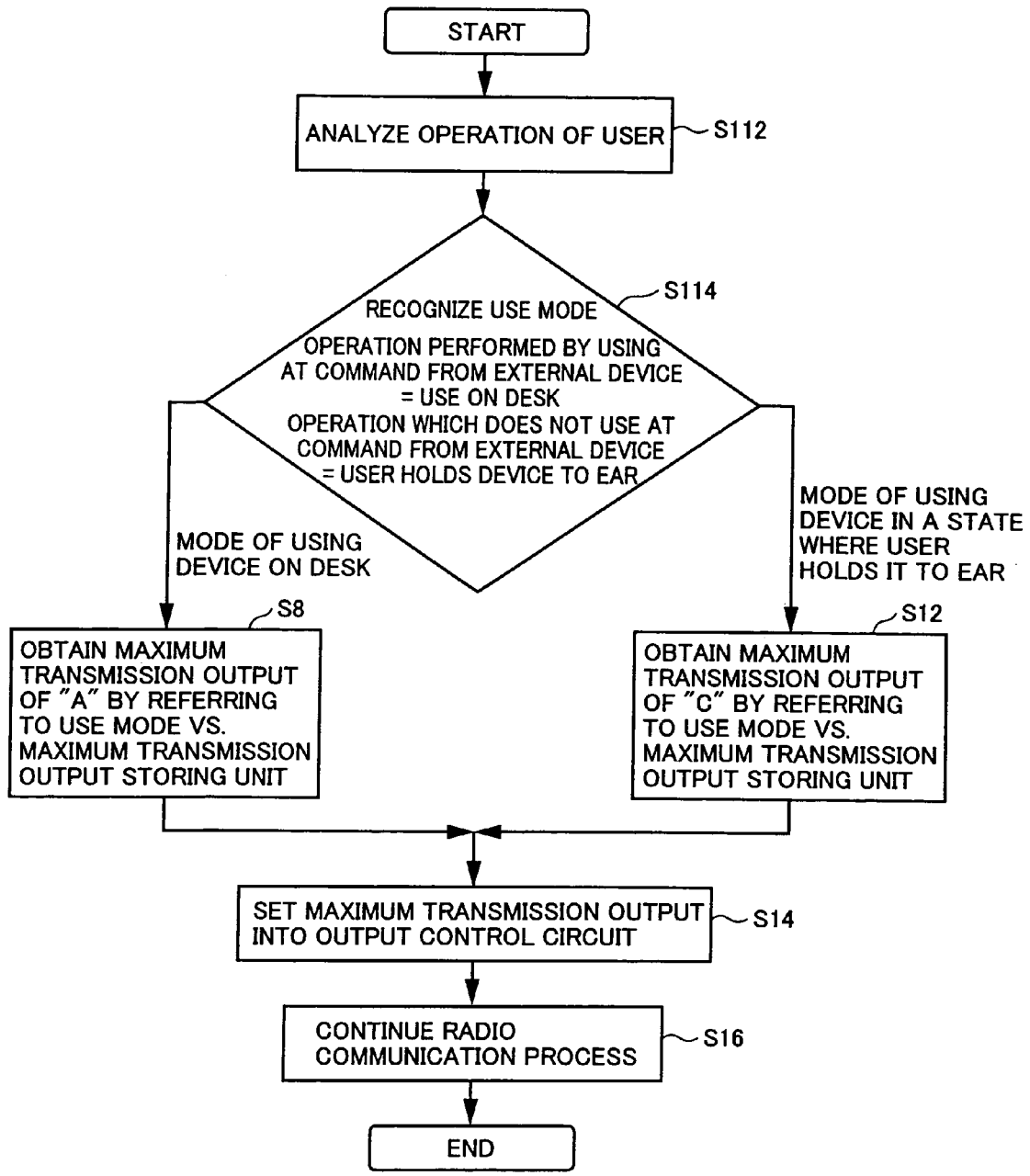
FIG. 21 is a flow chart of processes executed by the radio communication device according to the ninth embodiment.

Referring to FIG. 21, the components of radio communication device 71 operate as follows.

It is now assumed that, as usage modes, there are two modes of a mode of using the radio communication device on a desk and a usage mode in which the user holds the radio communication device to his/her ear.

In the case where the user "operates radio communication device 71 by using an AT command from an external device", it is considered that radio communication device 71 is used on a desk. In the other cases, it is considered that the user has radio communication device 71 on his/her hand and holds it to his/her ear. The AT command is a general command set used to control a modulator/demodulator (modem). As a case of using the AT command, a case of using radio communication device 71 as a modem, connecting a personal computer or the like to radio communication device 71, and performing data transfer or the like can be considered.

It is assumed that operations of the user to be analyzed are preset in CPU 77, and the correspondence relation between the operation on radio communication device 71 by the user and the usage mode is previously stored in the CPU. It is assumed that, in the usage mode vs. maximum transmission output storing unit 6, the maximum output value of "A" is stored in the case of using the radio communication device on a desk, and the maximum output value of "C" is stored in the case of the usage mode in which the user holds the radio communication device to his/her ear.

CPU 77 receives an operation performed on radio communication device 71 by the user from operation unit 15 and analyzes it (S112). CPU 77 determines whether or not the user has performed an operation via operation unit 15 from an external device by using the AT command (S114). When the user operates radio communication device 71 from an external device by using the AT command, CPU 77 determines that radio communication device 71 is used on a desk ("mode of using the radio communication device on a desk" in S114), and the maximum transmission output value of "A" is obtained from usage mode vs. maximum transmission output storing unit 6 (S8). In the other cases, CPU 77 determines that the user uses radio communication device 71 by holding it to his/her ear ("mode in which the user uses the radio communication device by holding it to his/her ear" in S114), and the maximum transmission output value of "C" is obtained from usage mode vs. maximum transmission output storing unit 6 S12).

According to the instruction of CPU 77, control circuit 73 sets the maximum transmission output value obtained by the process of S8 or S12 into output control circuit 4 (S14). After that, the radio communication process is continued (S16).

According to the embodiment, in the case where the usage mode is determined by a specific operating method of the user, by analyzing the operation of the user, it becomes possible to output the optimum maximum output power from the antenna.

Tenth Embodiment

In the first to ninth embodiments, various methods of realizing recognition of a usage mode of a radio communication device have been described above. It is also possible to construct a radio communication device by combining some of the plurality of realizing methods.

Figure 22:
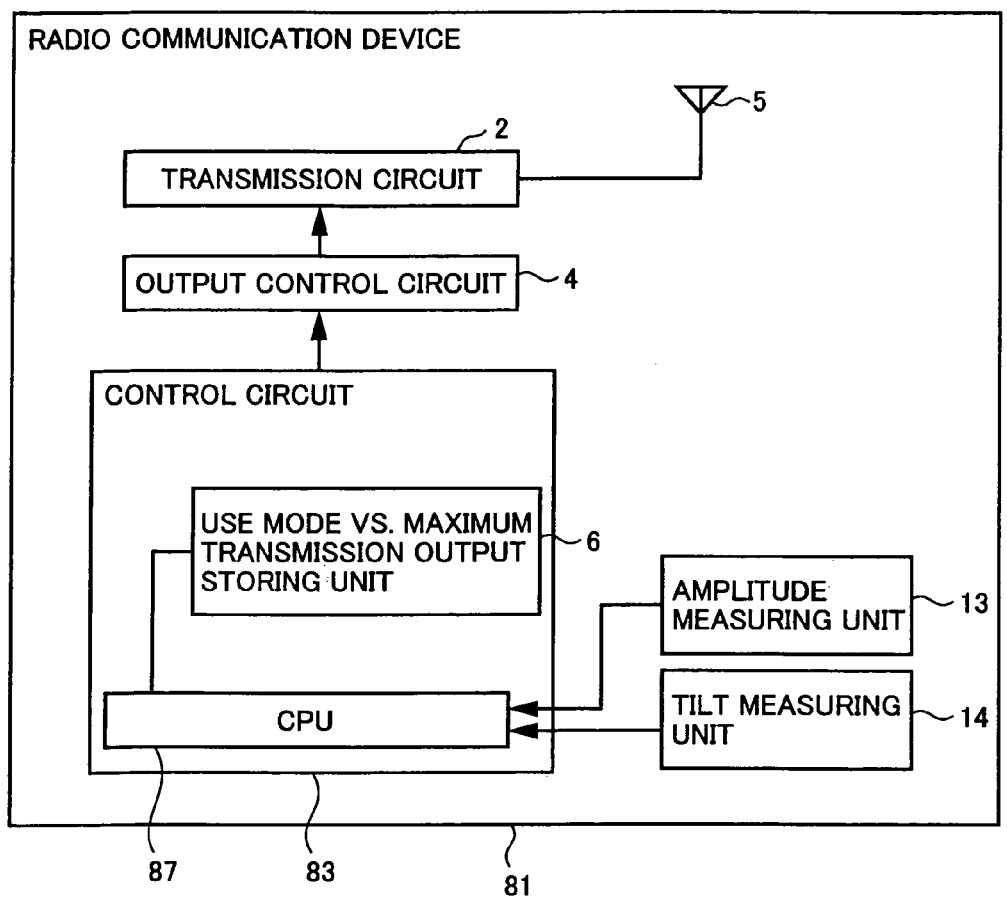
FIG. 22 is a block diagram showing the hardware configuration of a radio communication device according to a tenth embodiment.

FIG. 22 shows an example of the configuration. Referring to FIG. 22, a radio communication device 81 according to a tenth embodiment of the invention includes an antenna 5, a transmission circuit 2 connected to antenna 5, for transmitting an output signal from antenna 5, an output control circuit 4 connected to transmission circuit 2, for controlling an output of transmission circuit 2, an amplitude measuring unit 13 for measuring an amplitude of oscillation of radio communication device 81, a tilt measuring unit 14 for measuring tilt of radio communication device 81, and a control circuit 83 connected to amplitude measuring unit 13, tilt measuring unit 14, and output control circuit 4, for controlling output control circuit 4 on the basis of output results of amplitude measuring unit 13 and tilt measuring unit 14.

Control circuit 83 includes a usage mode vs. maximum transmission output storing unit 6 for storing a plurality of maximum transmission outputs which are predetermined in accordance with a plurality of usage modes of radio communication device 81, and a CPU 87 connected to usage mode vs. maximum transmission output storing unit 6, amplitude measuring unit 13, and tilt measuring unit 14, which executes processes according to a flow chart to be described hereinafter in accordance with the output results of amplitude measuring unit 13 and tilt measuring unit 14 to thereby control output control circuit 4.

Referring to FIG. 23, the components of radio communication device 81 operate as follows.

It is now assumed that, as usage modes, there are two modes of a mode of using the radio communication device on a desk and a usage mode in which the user holds the radio communication device to his/her ear.

In the case of using radio communication device 81 on a desk, a dedicated holder for holding radio communication device 81 exists. Consequently, when the tilt of radio communication device 81 is larger than a predetermined first threshold and is smaller than a predetermined second threshold which is larger than the first threshold, it is considered that radio communication device 81 is held in the dedicated holder on a desk. However, even when the tilt of radio communication device 81 lies between the first and second thresholds, a case where the user has radio communication device 81 by his/her hand and holds it to his/her ear can be also considered. Therefore, another condition is further added. The amplitude of radio communication device 81 is measured, and the number of times radio communication device 81 oscillates with an amplitude which is equal to or larger than the amplitude threshold per unit time is counted.

Specifically, only when the number of oscillation times of radio communication device 81 oscillates with the amplitude equal to or larger than the amplitude threshold is smaller than a count threshold and the tilt of radio communication device 81 lies between the first and second thresholds, it is considered that the radio communication device 81 is used on a desk. In the other cases, it is considered that radio communication device 81 is used in a state that the user holds it to his/her ear.

It is assumed that the first and second thresholds, amplitude threshold, count threshold, and unit time are preset in CPU 87, and the correspondence relations between the tilt and number of oscillation times of radio communication device 81 and the usage mode are previously stored in CPU 87. It is assumed that, in usage mode vs. maximum transmission output storing unit 6, the maximum output value of "A" is stored in the case of the mode of using the radio communication device on a desk, and the maximum output value of "C" is stored in the case of the mode of using the radio communication device by holding it to user's ear.

First, processes of S92 to S96 are executed to obtain the number of oscillation times of radio communication device 81. The processes are similar to those described by referring to FIG. 17. Consequently, the detailed description will not be repeated here.

In parallel with the processes of S92 to S96, processes of S102 and S104 are performed to obtain the tilt of radio communication device 81. The processes are similar to those described by referring to FIG. 19. Consequently, the detailed description will not be repeated here.

CPU 87 determines whether or not the number of oscillation times of radio communication device 81 is smaller than the count threshold and the tilt of radio communication device 81 is larger than the first threshold value and smaller than the second threshold (S122).

If the conditions in S122 are satisfied, CPU 87 determines that radio communication device 81 is used on a desk ("mode of using the radio communication device on a desk" in S122), and the maximum transmission output value of "A" is obtained from usage mode vs. maximum transmission output storing unit 6 (S8). When the conditions of S122 are not satisfied, CPU 87 determines that the user uses radio communication device 81 by holding it to his/her ear ("mode in which the user uses the radio communication device by holding it to his/her ear" in S122), and the maximum transmission output value of "C" is obtained from usage mode vs. maximum transmission output storing unit 6 (S12).

According to the instruction of CPU 87, control circuit 83 sets the maximum transmission output value obtained by the process of S8 or S12 into output control circuit 4 (S14). After that, the radio communication process is continued (S16).

According to the embodiment, by preparing a plurality of realizing methods of recognizing the usage mode in accordance with the characteristics of the radio communication device, it becomes possible to output the optimum maximum output power from the antenna.

INDUSTRIAL APPLICABILITY

As described above, in the radio communication device according to the invention, a usage mode of the user can be detected. Consequently, the invention is suitable for outputting an optimum maximum output power from an antenna in accordance with the usage mode of the user.

What is claimed is:

1. A radio communication device, comprising:
   a storing unit configured to store a plurality of maximum transmission outputs corresponding to a plurality of predetermined usage modes;
   a usage mode detecting unit configured to detect a usage mode;
   a maximum transmission output determining unit connected to said usage mode detecting unit and said storing unit and configured to determine a maximum transmission output based on a detection result of said usage mode detecting unit;
   a transmission circuit configured to transmit a signal; and
   an output control circuit connected to said maximum transmission output determining unit and said transmission circuit and configured to control a transmission output from said transmission circuit based on said maximum transmission output.

2. The radio communication device according to claim 1, wherein said usage mode detecting unit is configured to detect the usage mode based on whether an external device is connected or not.

3. The radio communication device according to claim 1, wherein said usage mode detecting unit is configured to detect the usage mode at predetermined intervals.

4. The radio communication device according to claim 1, wherein said usage mode detecting unit is configured to detect the usage mode at a time of receiving an incoming call or originating a call.

5. The radio communication device according to claim 1, wherein said usage mode detecting unit is configured to detect the usage mode at a time of turn-on of the radio communication device.

6. The radio communication device according to claim 1, wherein said usage mode detecting unit is configured to perform communication with an external device and, based on a result of the communication, detect the usage mode.

7. The radio communication device according to claim 1, wherein said usage mode detecting unit comprises:
   a temperature measuring unit configured to measure a temperature of the periphery of the radio communication device; and
   a detecting circuit connected to said temperature measuring unit and configured to detect a usage mode based on an output result of said temperature measuring unit.

8. The radio communication device according to claim 1, wherein said usage mode detecting unit comprises:
   a distance measuring unit configured to measure a distance from the radio communication device to an obstacle; and
   a detecting circuit connected to said distance measuring unit and configured to detect a usage mode based on an output result of said distance measuring unit.

9. The radio communication device according to claim 1, wherein said usage mode detecting unit comprises:
   an amplitude measuring unit configured to measure an amplitude of oscillation of the radio communication device; and
   a detecting circuit connected to said amplitude measuring unit and configured to detect the usage mode based on an output result of said amplitude measuring unit.

10. The radio communication device according to claim 1, wherein said usage mode detecting unit comprises:
a tilt measuring unit configured to measure a tilt of the radio communication device; and
a detecting circuit connected to said tilt measuring unit and configured to detect the usage mode based on of an output result of said tilt measuring unit.

11. The radio communication device according to claim 1, wherein said usage mode detecting unit comprises:
an operation unit configured to receive an operation on the radio communication device; and
a detecting circuit connected to said operation unit and configured to detect the usage mode based on an output result of said operation unit.

12. The radio communication device according to claim 1, wherein said usage mode detecting unit comprises:
an amplitude measuring unit configured to measure an amplitude of oscillation of the radio communication device;
a tilt measuring unit configured to measure a tilt of the radio communication unit; and
a detecting circuit connected to said amplitude measuring unit and said tilt measuring unit and configured to detect the usage mode based on output results of said amplitude measuring unit and said tilt measuring unit.

13. A transmission method of a radio communication device, comprising the steps of:
storing a plurality of maximum transmission outputs corresponding to a plurality of predetermined usage modes in a storing unit;
detecting a usage mode;
determining a maximum transmission output stored in said storing unit based on a detection result of said usage mode; and
controlling a transmission output from a transmission circuit configured to transmit a signal based on determined said maximum transmission output.

14. The transmission method of a radio communication device according to claim 13, wherein
in said step of detecting a usage mode, the usage mode is detected based on whether an external device is connected or not.

15. The transmission method of a radio communication device according to claim 13, wherein
in said step of detecting a usage mode, the usage mode is detected at predetermined intervals.

16. The transmission method of a radio communication device according to claim 13, wherein
in said step of detecting a usage mode, the usage mode is detected at a time of receiving an incoming call or originating a call.

17. The transmission method of a radio communication device according to claim 13, wherein
in said step of detecting a usage mode, the usage mode is detected at a time of turn-on of the radio communication device.

18. The transmission method of a radio communication device according to claim 13, wherein
in said step of detecting a usage mode, communication with an external device is performed and the usage mode is detected based on a result of the communication.

19. The transmission method of a radio communication device according to claim 13, wherein said step of detecting a usage mode includes the steps of:
measuring a temperature of the periphery of the radio communication device; and
detecting a usage mode based on a measurement result of the temperature of the periphery of the radio communication device.

20. The transmission method of a radio communication device according to claim 13, wherein said step of detecting a usage mode includes the steps of:
measuring a distance from the radio communication device to an obstacle; and
detecting a usage mode based on a measurement result of the distance from the radio communication device to the obstacle.

21. The transmission method of a radio communication device according to claim 13, wherein said step of detecting a usage mode includes the steps of:
measuring an amplitude of oscillation of the radio communication device; and
detecting a usage mode based on a measurement result of the amplitude of oscillation of the radio communication device.

22. The transmission method of a radio communication device according to claim 13, wherein said step of detecting a usage mode includes the steps of:
measuring a tilt of the radio communication device; and
detecting a usage mode based on a measurement result of the tilt of the radio communication device.

23. The transmission method of a radio communication device according to claim 13, wherein said step of detecting a usage mode includes the steps of:
receiving an operation on the radio communication device; and
detecting a usage mode based on a result of reception of the operation on the radio communication device.

24. The transmission method of a radio communication device according to claim 13, wherein said step of detecting a usage mode includes the steps of:
measuring an amplitude of oscillation of the radio communication device;
measuring a tilt of the radio communication device; and
detecting a usage mode based on measurement results of the amplitude of oscillation of the radio communication device and the tilt of the radio communication device.

* * * * *